US012719974B2

(12) United States Patent
Sun et al.

(10) Patent No.: US 12,719,974 B2
(45) Date of Patent: Aug. 25, 2026

(54) ROTARY MECHANISM, SUPPORT APPARATUS, AND ELECTRONIC DEVICE

(71) Applicant: HONOR DEVICE CO., LTD., Shenzhen (CN)

(72) Inventors: Jian Sun, Shenzhen (CN); Yaolei Zhang, Shenzhen (CN); Haifei Li, Shenzhen (CN); Yuan Wang, Shenzhen (CN); Guotong Zhou, Shenzhen (CN); Leibo Yuan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 672 days.

(21) Appl. No.: 17/791,346

(22) PCT Filed: Jan. 13, 2022

(86) PCT No.: PCT/CN2022/071900

§ 371 (c)(1),
(2) Date: Apr. 22, 2024

(87) PCT Pub. No.: WO2022/247310

PCT Pub. Date: Dec. 1, 2022

(65) Prior Publication Data

US 2024/0388647 A1 Nov. 21, 2024

(30) Foreign Application Priority Data

May 27, 2021 (CN) ......................... 202110587683.5

(51) Int. Cl.
*H04M 1/02* (2006.01)
*E05D 11/00* (2006.01)
(Continued)

(52) U.S. Cl.
CPC ......... *H04M 1/0268* (2013.01); *H04M 1/022* (2013.01)

(58) Field of Classification Search
None
See application file for complete search history.

(56) References Cited

U.S. PATENT DOCUMENTS 11,194,366 B2 * 12/2021 Cheng .................. G06F 1/1626
11,669,132 B2 * 6/2023 Siddiqui ............... G06F 1/1647 361/679.27
(Continued)

FOREIGN PATENT DOCUMENTS

CN 209375705 U 9/2019
CN 110312007 A 10/2019
(Continued)

*Primary Examiner* — Pablo N Tran

(57) ABSTRACT

This application provides a rotary mechanism, a support apparatus, and an electronic device, and relates to the field of electronic device technologies, allowing the electronic device to be lighter and thinner in an unfolded state. The rotary mechanism includes a base, a first connector, a second connector, a lifting plate, a first torsion spring, and a second torsion spring. The first connector and the second connector are rotatably connected to the base by a first rotary shaft and a second rotary shaft respectively. The first torsion spring includes a first spiral body and a first torsion arm. The first spiral body is sleeved on the first rotary shaft. One end of the first torsion arm is fixed to one end of the first spiral body. An other end of the first torsion arm is slidably connected to the lifting plate in a first direction. The second torsion spring includes a second spiral body and a second torsion arm. The second spiral body is sleeved on the second rotary shaft. One end of the second torsion arm is fixed to one end of the second spiral body. An other end of the second torsion arm is slidably connected to the lifting plate in the first direction. The rotary mechanism provided in embodiments of this application is used for supporting a bending portion of the foldable screen.

13 Claims, 19 Drawing Sheets

(51) Int. Cl.

| | |
|---|---|
| ***E05D 11/08*** | (2006.01) |
| ***G06F 1/16*** | (2006.01) |
| ***G06F 1/18*** | (2026.01) |
| ***H05K 5/02*** | (2006.01) |

(56) References Cited

U.S. PATENT DOCUMENTS

| | | | | |
|---|---|---|---|---|
| 11,720,151 | B2 * | 8/2023 | Park | G06F 1/1681 361/679.27 |
| 11,846,997 | B2 * | 12/2023 | Liao | H04M 1/0216 |
| 11,974,407 | B2 * | 4/2024 | Cao | H05K 5/0226 |
| 12,096,580 | B2 * | 9/2024 | Yang | H04M 1/0216 |
| 12,336,122 | B2 * | 6/2025 | Wang | H05K 1/148 |
| 12,501,797 | B2 * | 12/2025 | Ding | G06F 1/1641 |
| 2018/0343330 | A1 | 11/2018 | Lin et al. | |
| 2020/0363843 | A1 | 11/2020 | Cheng | |
| 2021/0096596 | A1 | 4/2021 | Cheng | |

FOREIGN PATENT DOCUMENTS

| | | | |
|---|---|---|---|
| CN | 110428730 | A | 11/2019 |
| CN | 110570769 | A | 12/2019 |
| CN | 110719346 | A | 1/2020 |
| CN | 111163199 | A | 5/2020 |
| CN | 210836896 | U | 6/2020 |
| CN | 111741146 | A | 10/2020 |
| CN | 111885235 | A | 11/2020 |
| CN | 111968513 | A | 11/2020 |
| CN | 112153188 | A | 12/2020 |
| CN | 112269426 | A | 1/2021 |
| CN | 112682670 | A | 4/2021 |
| CN | 213069648 | U | 4/2021 |
| CN | 112817377 | A | 5/2021 |
| CN | 113905113 | A | 1/2022 |
| CN | 113923281 | A | 1/2022 |

* cited by examiner

CONT. FROM FIG. 15(a)
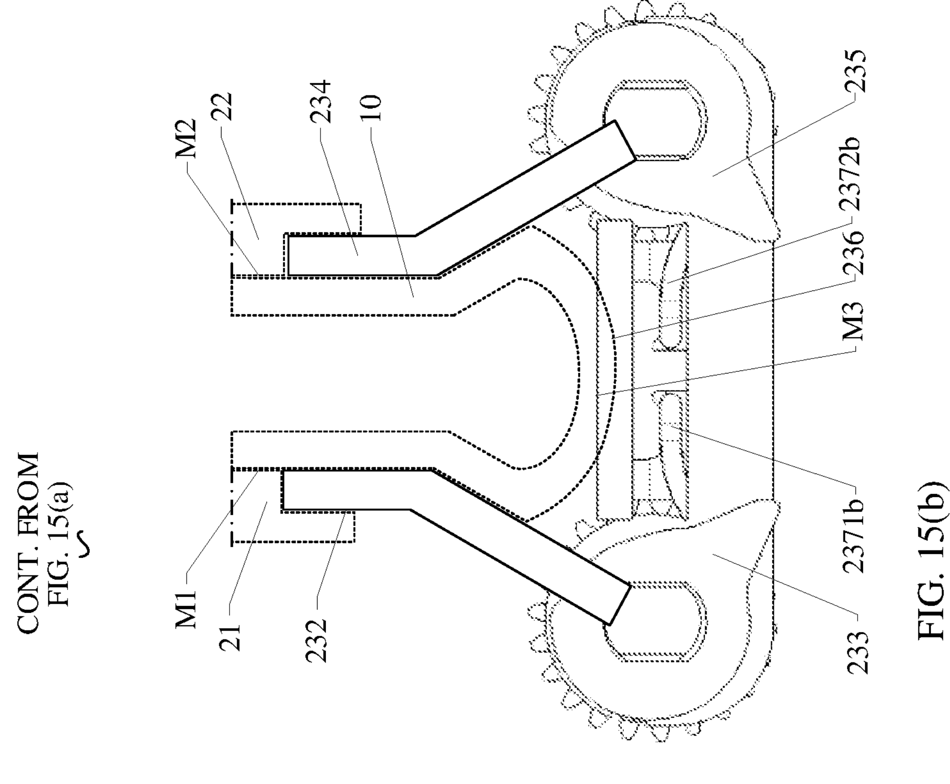
FIG. 15(b)
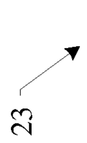
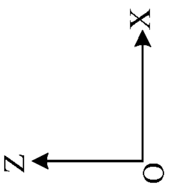

ROTARY MECHANISM, SUPPORT APPARATUS, AND ELECTRONIC DEVICE

CROSS-REFERENCE TO RELATED APPLICATIONS

This application is a National Stage of International Application No. PCT/CN2022/071900, filed Jan. 13, 2022, which claims priority to Chinese Patent application Ser. No. 202110587683.5, filed May 27, 2021, both of which are hereby incorporated by reference in their entireties.

TECHNICAL FIELD

This application relates to the field of electronic device technologies, and in particular, to a rotary mechanism, a support apparatus, and an electronic device.

BACKGROUND

With the development of foldable screen technologies, electronic devices with foldable screens have become a hot technology. Existing folding methods are categorized into inward folding and outward folding. That is, after being folded, a screen is on an inner side or an outer side. The problem of outward folding is that a screen is in an exposed state and is prone to scratches by a hard object.

For an existing foldable screen, components such a base, a panel, a synchronizing mechanism, and a lifting plate usually need to be arranged in an intermediate bending area of a support apparatus to allow a left portion and a right part of the foldable screen to rotate synchronously and switch between an unfolded state and a folded state. In a case that the foldable screen is in the unfolded state, the panel is flush with the lifting plate, so that the foldable screen supported on the panel is flat. In a case that the foldable screen is in the folded state, in one aspect, the panel rotates to a specific tilt angle relative to the lifting plate, and in another aspect, the lifting plate sinks to fold a bending portion of the foldable screen into a “water drop-shaped” structure. This “water drop-shaped” foldable screen portion has a relatively large inward folding angle and therefore has higher reliability and longer service life. However, currently, in this type of electronic devices with foldable screens, a lifting mechanism used for driving the lifting plate to sink has a complex structure, and a size of the lifting mechanism in a thickness direction of the electronic device is relatively large in a case that the foldable screen is in the unfolded state, which is not conducive to reducing a thickness of the electronic device in the unfolded state and is therefore not conducive to a thin design of the electronic device.

SUMMARY

Embodiments of this application provide a rotary mechanism, a support apparatus, and an electronic device, which can reduce a size of the lifting mechanism in a thickness direction of the electronic device in a case that the electronic device is in an unfolded state, so that the electronic device is lighter and thinner in the unfolded state.

To achieve the foregoing objective, the following technical solutions are used in the embodiments of this application:

In a first aspect, some embodiments of this application provide a rotary mechanism. The rotary mechanism includes a base, a first connector, a second connector, a lifting plate, a first torsion spring, and a second torsion spring. The first connector is rotatably connected to the base by a first rotary shaft. The first connector is configured to connect to a first housing. The second connector is rotatably connected to the base by a second rotary shaft. The second connector is configured to connect to a second housing. The second rotary shaft is parallel to the first rotary shaft. The lifting plate is located between the first connector and the second connector. The lifting plate includes a fitting surface. The fitting surface is used for fitting a part of the foldable screen. The first torsion spring includes a first spiral body and a first torsion arm. The first spiral body is sleeved on the first rotary shaft. The first torsion arm is located on a side of the lifting plate away from the fitting surface. One end of the first torsion arm is fixed to one end of the first spiral body. An other end of the first torsion arm is slidably connected to the lifting plate in a first direction. The second torsion spring includes a second spiral body and a second torsion arm. The second spiral body is sleeved on the second rotary shaft. The second torsion arm is located on the side of the lifting plate away from the fitting surface. One end of the second torsion arm is fixed to one end of the second spiral body. An other end of the second torsion arm is slidably connected to the lifting plate in the first direction. The first direction is parallel to the lifting plate and perpendicular to the first rotary shaft.

The first connector and the second connector are rotatable between an unfolded position and a folded position relative to the base. In a case that the first connector and the second connector are rotated from the unfolded position to the folded position, the first torsion arm and the second torsion arm may be driven to swing away from the fitting surface of the lifting plate, to drive the lifting plate to sink. In a case that the first connector and the second connector are rotated from the folded position to the unfolded position, the first torsion arm and the second torsion arm may be driven to swing toward the fitting surface of the lifting plate, to drive the lifting plate to rise.

In the rotary mechanism provided in the embodiments of this application, the first torsion spring and the second torsion spring are respectively mounted in surrounding spaces of the first rotary shaft and the second rotary shaft. The lifting plate is driven by the first torsion spring and the second torsion spring to sink and rise, which can reduce a height occupied by a lifting structure in a thickness direction of the electronic device in an unfolded state, thereby allowing the electronic device to be lighter and thinner in the unfolded state.

In a possible implementation of the first aspect, the first connector is fixed on the first rotary shaft. A first rotary hole is provided in the base. The first rotary shaft passes through the first rotary hole, and is rotatable in the first rotary hole. The second connector is fixed on the second rotary shaft. A second rotary hole is provided in the base. The second rotary shaft passes through the second rotary hole, and is rotatable in the second rotary hole. This structure is simple and easy to be implemented.

In a possible implementation of the first aspect, a first gear is fixed on the first rotary shaft. A central axis of the first gear is collinear with a central axis of the first rotary shaft. A second gear is fixed on the second rotary shaft. A central axis of the second gear is collinear with a central axis of the second rotary shaft. A diameter of the first gear is equal to a diameter of the second gear. The first gear and the second gear are in meshed transmission, or an even quantity of intermediate gears are arranged between the first gear and the second gear. The first gear, the even quantity of intermediate gears, the second gear are sequentially in meshed transmission. In this way, the first connector and the second connector may be driven by the first gear and the second gear or by the first gear, the even quantity of intermediate gears, and the second gear to rotate synchronously in opposite directions.

In a possible implementation of the first aspect, there are two intermediate gears. In this way, both the height and the structural complexity of the rotary mechanism can be ensured.

In a possible implementation of the first aspect, the first spiral body is sleeved on the first rotary shaft. The first rotary shaft is rotatable in the first spiral body. An other end of the first spiral body is fixed on the base. The second spiral body is sleeved on the second rotary shaft. The second rotary shaft is rotatable in the second spiral body. An other end of the second spiral body is fixed on the base. The rotary mechanism further includes a first support arm and a second support arm. The first support arm and the second support arm are both located on a side of the lifting plate away from the fitting surface. One end of the first support arm is fixed on the first rotary shaft. An other end of the first support arm extends toward the second rotary shaft. One end of the second support arm is fixed on the second rotary shaft. An other end of the second support arm extends toward the first rotary shaft. In a case that the first connector and the second connector are in the unfolded position, the lifting plate is supported on the first support arm and the second support arm. The first torsion arm and the second torsion arm are in a deformed state swinging toward the fitting surface. In a case that the first connector and the second connector are rotated from the unfolded position to the folded position, the first support arm and the second support arm swing away from the fitting surface. The first torsion arm and the second torsion arm swing away from the fitting surface under the action of elastic forces of the first torsion arm and the second torsion arm. In a case that the first connector and the second connector are rotated from a folded state to the unfolded state, the lifting plate may be lifted by using the first support arm and the second support arm, to drive the first torsion arm and the second torsion arm to swing toward the fitting surface.

In a possible implementation of the first aspect, in a case that the first connector and the second connector are in the unfolded position, a swing deformation angle of each of the first torsion arm and the second torsion arm toward the fitting surface is greater than 0° and less than or equal to 85°. In some embodiments, the swing deformation angle is 45°. In this way, in a case that the first connector and the second connector are rotated by an angle from the unfolded position to the folded position, the lifting plate sinks to a lowest position. Then, the lifting plate no longer sinks in a process that the first connector and the second connector continue to rotate, thereby helping to control a sinking height of the lifting plate.

In a possible implementation of the first aspect, a shaft sleeve is arranged on the base. The shaft sleeve is rotatably sleeved on the first rotary shaft. The first spiral body is sleeved on the shaft sleeve. In this way, the first spiral body is indirectly sleeved on the first rotary shaft by the shaft sleeve. A contact surface between the shaft sleeve and the first rotary shaft is relatively large, which can avoid jamming due to stress concentration during relative rotation.

In a possible implementation of the first aspect, a limiting groove is provided in the base. The limiting groove extends in a direction parallel to the first rotary shaft. A third torsion arm is embedded in the limiting groove. Therefore, the third torsion arm and the base are fixed without a complex welding operation. The assembly efficiency of the rotary mechanism can be improved.

In a possible implementation of the first aspect, a first flat position is arranged on the first rotary shaft. A flat position hole is provided in one end of the first support arm. The first support arm is sleeved on the first rotary shaft by cooperating with the flat position hole. In this way, the connection stability between the first support arm and the first rotary shaft is adequate, and mounting is convenient, which can reduce the assembly difficulty of the rotary mechanism and improve the assembly efficiency of the rotary mechanism.

In a possible implementation of the first aspect, a hook portion is arranged on the first torsion arm. A hook is arranged on a surface of the lifting plate away from the fitting surface. The hook includes a guide section extending in the first direction. The first torsion arm is hooked on the hook by the hook portion and is slidable along the guide section. Therefore, a slidable connection between the first torsion arm and the lifting plate is implemented.

In a possible implementation of the first aspect, the first spiral body includes a first spiral portion and a second spiral portion. The first spiral portion and the second spiral portion are sleeved on the first rotary shaft. The first spiral portion is spaced apart from the second spiral portion in a length direction of the first rotary shaft. An end of the first spiral portion close to the second spiral portion is a first end of the first spiral portion. An end of the second spiral portion close to the first spiral portion is a first end of the second spiral portion. An end of the second spiral portion away from the first spiral portion is a second end of the second spiral portion. The first torsion arm has an n shape. Two ends of the first torsion arm are fixed between the first end of the first spiral portion and the first end of the second spiral portion, and an intermediate bending portion of the first torsion arm forms the hook portion.

In a possible implementation of the first aspect, an end of the first spiral portion away from the second spiral portion is a second end of the first spiral portion. An end of the second spiral portion away from the first spiral portion is a second end of the second spiral portion. The first spiral body is fixed on the base by the second end of the first spiral portion and the second end of the second spiral portion. In this way, the first torsion spring is symmetrically designed. The first torsion spring may be fixed on the base by the second end of the first spiral portion and the second end of the second spiral portion, which can ensure the connection stability between the first torsion spring and the base.

In a possible implementation of the first aspect, the first spiral body is fixedly sleeved on the first rotary shaft. The first torsion arm is located on a side of the first rotary shaft close to the second rotary shaft. The second spiral body is fixedly sleeved on the second rotary shaft. The second torsion arm is located on a side of the second rotary shaft close to the first rotary shaft. In a case that the first connector and the second connector are rotated from the unfolded position to the folded position, the first torsion arm and the second torsion arm may be driven to swing away from the fitting surface of the lifting plate. In a case that the first connector and the second connector are rotated from the folded position to the unfolded position, the first torsion arm and the second torsion arm may be driven to swing toward the fitting surface of the lifting plate. This structure is simple in composition, and the cost of the rotary mechanism is low.

In a possible implementation of the first aspect, a second flat position is arranged on the first rotary shaft. An inner hole of the first spiral body is a flat position hole. The first spiral body is sleeved on the first rotary shaft by cooperating with the inner hole. In this way, the connection stability between the first torsion spring and the first rotary shaft is adequate, and mounting is convenient, which can reduce the assembly difficulty of the rotary mechanism and improve the assembly efficiency of the rotary mechanism.

In a second aspect, some embodiments of this application provide a support apparatus. The support apparatus includes a first housing, a second housing, and the rotary mechanism according to any one of the foregoing technical solutions. The rotary mechanism is located between the first housing and the second housing. A first connector of the rotary mechanism is connected to the first housing. A second connector of the rotary mechanism is connected to the second housing.

Because the support apparatus provided in the embodiments of this application includes the rotary mechanism according to any one of the foregoing technical solutions, the two can solve the same technical problem and achieve the same effect.

In a third aspect, some embodiments of this application provide an electronic device. The electronic device includes a foldable screen and the support apparatus according to the foregoing technical solutions. The foldable screen includes a first portion, a second portion, and a third portion. The third portion is located between the first portion and the second portion. The first portion is supported and fixed on the first housing. The second portion is supported and fixed on the second housing. The third portion is supported on a rotary mechanism of the support apparatus.

Because the electronic device provided in the embodiments of this application includes the support apparatus according to any one of the foregoing technical solutions, the two can solve the same technical problem and achieve the same effect.

DESCRIPTION OF EMBODIMENTS

In embodiments of this application, terms “first” and “second” are used merely for the purpose of description, and shall not be construed as indicating or implying relative importance or implying a quantity of indicated technical features. Therefore, features defining “first” and “second” may explicitly or implicitly include one or more such features.

In the embodiments of this application, terms “include”, “comprise”, and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence “including one” does not exclude that there are still other same elements in the process, method, object, or apparatus.

This application provides an electronic device. The electronic device is an electronic device having a foldable screen. Specifically, the electronic device includes but not limited to an electronic device such as a mobile phone, a tablet computer (tablet personal computer), a laptop computer (laptop computer), a personal digital assistant (personal digital assistant, PDA), a personal computer, a notebook computer (notebook), an in-vehicle device, or a wearable device (for example, a watch).

Figure 1:
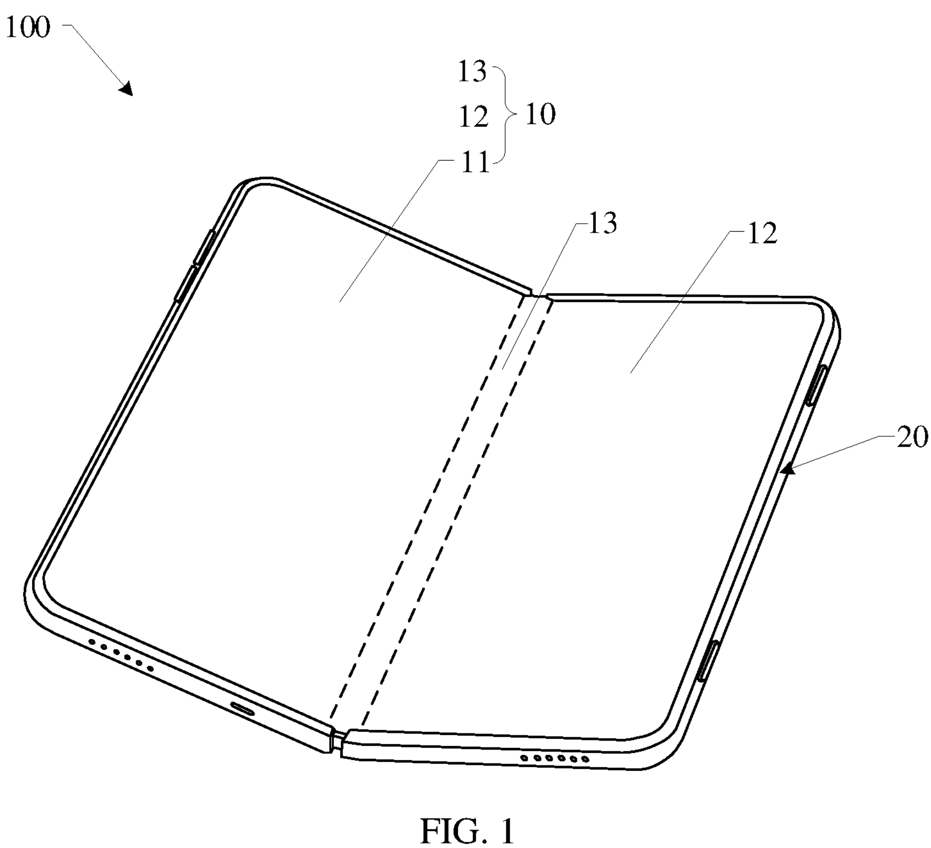
FIG. 1 is a three-dimensional view of an electronic device according to some embodiments of this application.

FIG. 1 is a three-dimensional view of an electronic device 100 according to some embodiments of this application. In this embodiment, the electronic device 100 is a mobile phone with a foldable screen. The electronic device 100 includes a foldable screen 10 and a support apparatus 20. It may be understood that FIG. 1 only schematically shows some components included in the electronic device 100. The actual shapes, actual sizes, actual positions, and actual structures of these components are not limited in FIG. 1.

The foldable screen 10 is configured to display an image, a video, or the like. The foldable screen 10 may be folded into a first portion 11 and a second portion 12. The foldable screen 10 further includes a third portion 13 located between the first portion 11 and the second portion 12. At least the third portion 13 of the foldable screen 10 is made of a flexible material. The first portion 11 and the second portion 12 may be made of a flexible material or a rigid material, or partially made of a rigid material and partially made of flexible material, which is not specifically limited herein.

Specifically, the foldable screen 10 may be an organic light-emitting diode (organic light-emitting diode, OLED) screen, a micro organic light-emitting diode (micro organic light-emitting diode) screen, a quantum dot light-emitting diode (quantum dot light emitting diodes, QLED) screen, a liquid crystal display (liquid crystal display, LCD), or the like.

The foldable screen 10 may be folded between an unfolded state and a folded state.

Figure 2:
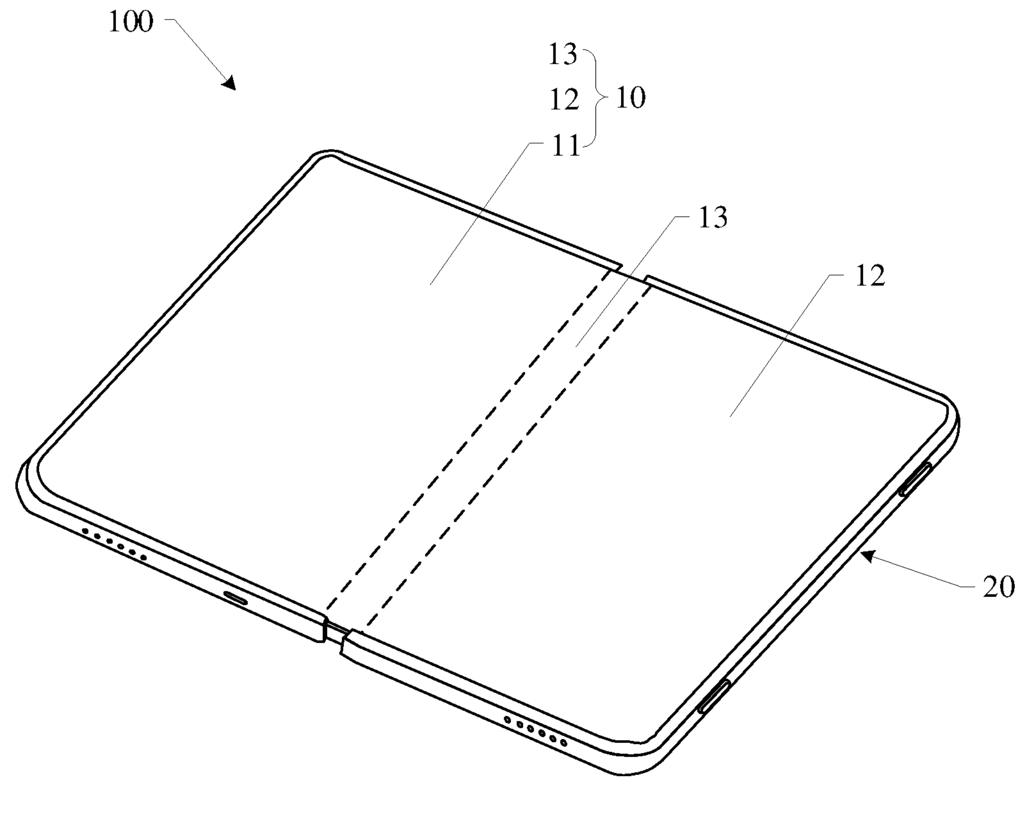
FIG. 2 is a schematic structural diagram of the electronic device shown in FIG. 1 in a case that a foldable screen is in an unfolded state.

FIG. 2 is a schematic structural diagram of the electronic device 100 shown in FIG. 1 in a case that the foldable screen 10 is in an unfolded state. In a case that the foldable screen 10 is in the unfolded state, the first portion 11, the second portion 12, and the third portion 13 are arranged coplanarly and have the same orientation. In this state, a large-screen display can be implemented, which may provide a user with richer information and bring better use experience to the user.

Figure 3:
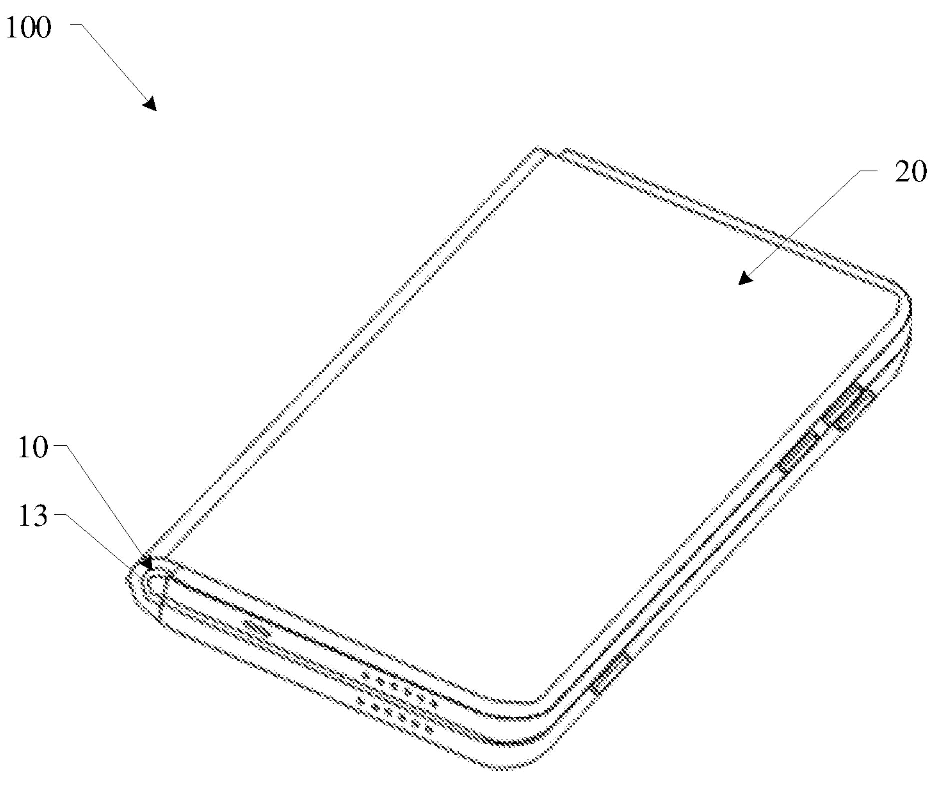
FIG. 3 is a schematic structural diagram of the electronic device shown in FIG. 1 in a case that a foldable screen is in a folded state.

FIG. 3 is a schematic structural diagram of the electronic device 100 shown in FIG. 1 in a case that the foldable screen 10 is in a folded state. In a case that the foldable screen 10 is in the folded state, the third portion 13 is in a bent state. The first portion (not shown in the figure) is opposite to the second portion (not shown in the figure). The foldable screen 10 is invisible to the user. The support apparatus 20 protects outside the foldable screen 10 to prevent the foldable screen 10 from being scratched by a hard object.

Figure 4:
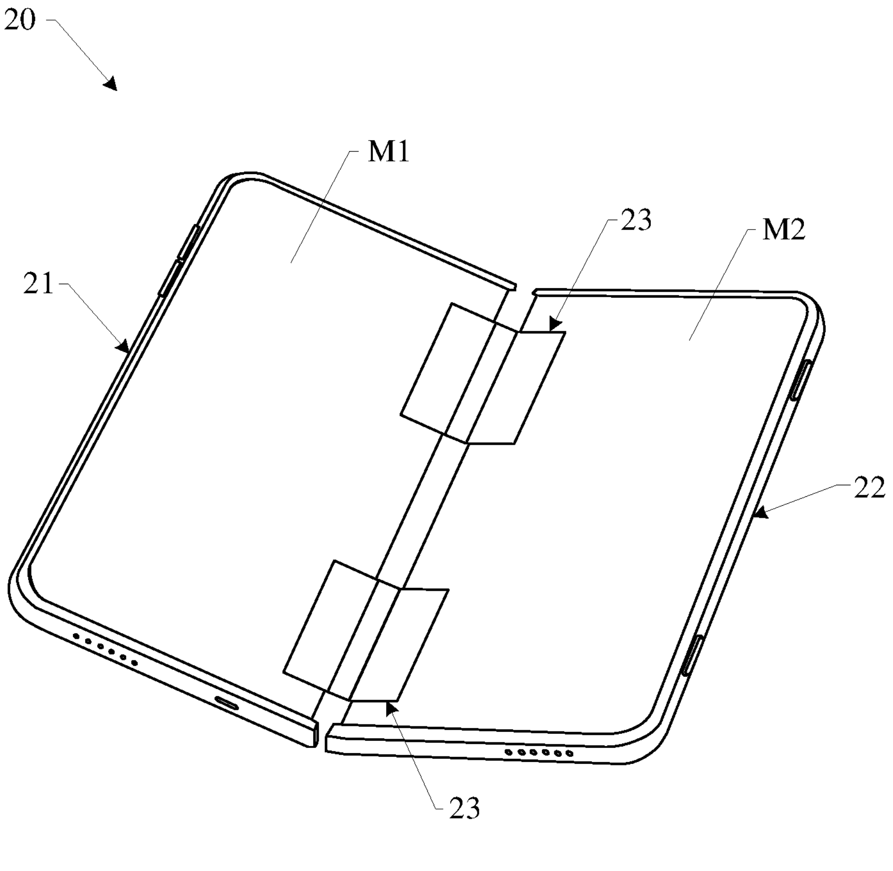
FIG. 4 is a three-dimensional view of a support apparatus in the electronic device shown in FIG. 1.

The support apparatus 20 is configured to support the foldable screen 10 and allow the foldable screen 10 to be folded between the unfolded state and the folded state. FIG. 4 is a three-dimensional view of a support apparatus 20 in the electronic device 100 shown in FIG. 1. In this embodiment, the support apparatus 20 includes a first housing 21, a second housing 22, and a rotary mechanism 23. It may be understood that FIG. 4 only schematically shows some components included in the support apparatus 20. The actual shapes, sizes, positions, and configurations of these components are not limited in FIG. 4.

The first housing 21 is configured to fix and support the first portion 11 of the foldable screen 10 in FIG. 1. Specifically, the first housing 21 includes a fitting surface M1. The first housing 21 is configured to fix and support the first portion 11 of the foldable screen 10 in FIG. 1 by the fitting surface M1.

The second housing 22 is configured to fix and support the second portion 12 of the foldable screen 10 in FIG. 1. Specifically, the second housing 22 includes a fitting surface M2. The second housing 22 is configured to fix and support the second portion 12 of the foldable screen 10 in FIG. 1 by the fitting surface M2.

A first accommodating cavity (not shown in the figure) is formed inside the first housing 21. A second accommodating cavity (not shown in the figure) is formed inside the second housing 22. The first accommodating cavity and the second accommodating cavity are configured to accommodate electronic components such as a motherboard, a battery, a camera module, a speaker, or a receiver of the electronic device 100.

The first housing 21 may be a structural whole, or may be assembled by a plurality of portions. Similarly, the second housing 22 may be a structural whole or may be assembled by a plurality of portions.

Figure 5:
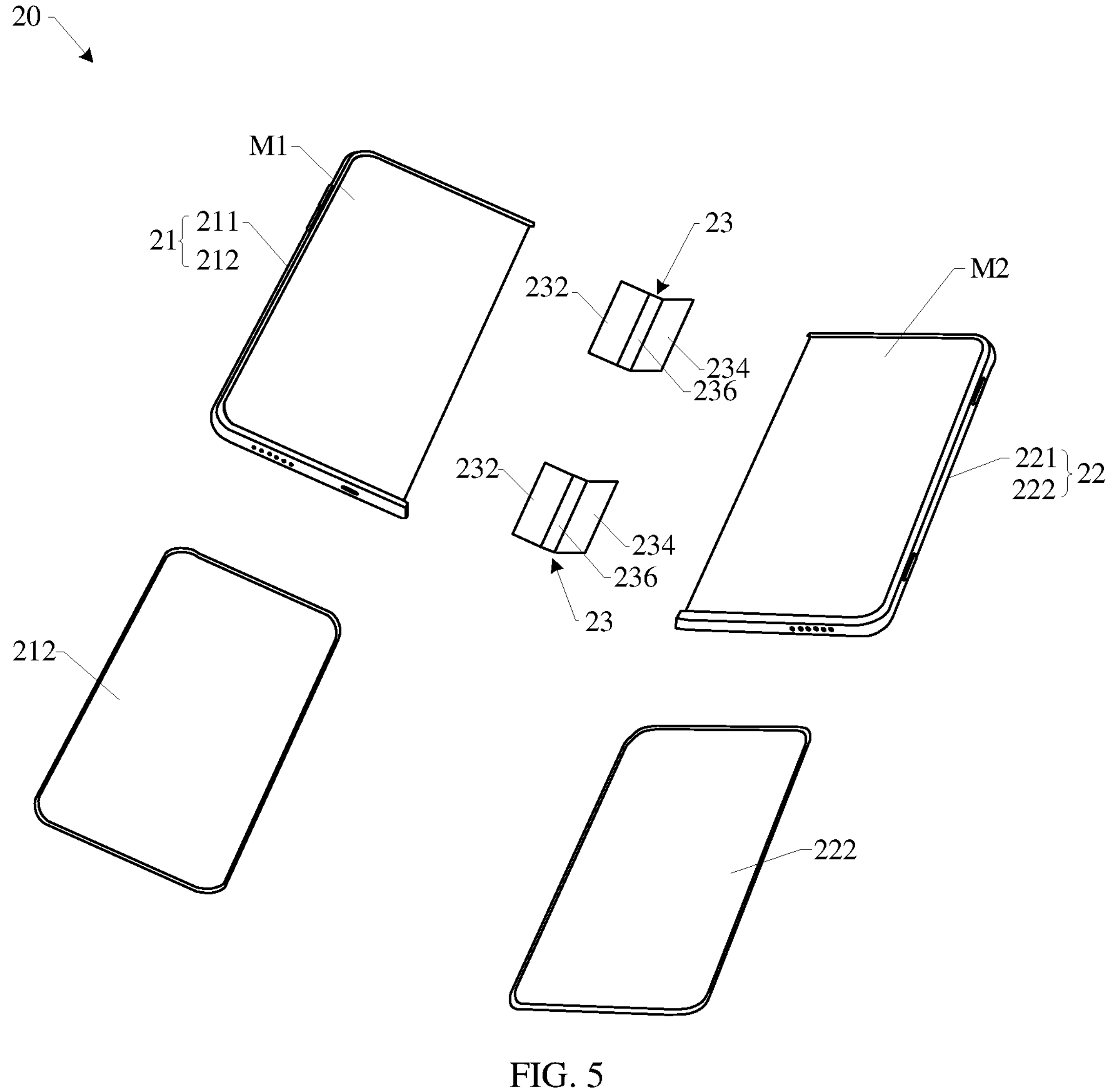
FIG. 5 is an exploded view of the support apparatus shown in FIG. 4.

In some embodiments, FIG. 5 is an exploded view of the support apparatus 20 shown in FIG. 4. The first housing 21 includes a first intermediate frame 211 and a first back cover 212. The fitting surface M1 is located on the first intermediate frame 211. The first back cover 212 is fixed on a side of the first intermediate frame 211 away from the fitting surface M1. The first accommodating cavity is formed between the first intermediate frame 211 and the first back cover 212.

The second housing 22 includes a second intermediate frame 221 and a second back cover 222. The fitting surface M2 is located on the second intermediate frame 221. The second back cover 222 is fixed on a side of the second intermediate frame 221 away from the fitting surface M2. The second accommodating cavity is formed between the second intermediate frame 221 and the second back cover 222.

The rotary mechanism 23 is configured to support the third portion 13 of the foldable screen 10. The rotary mechanism 23 is connected between the first housing 21 and the second housing 22. The first housing 21 and the second housing 22 are rotatably connected by the rotary mechanism 23. In some embodiments, the rotary mechanism 23 is connected between the first intermediate frame 211 of the first housing 21 and the second intermediate frame 221 of the second housing 22. In other embodiments, the rotary mechanism 23 may be connected between the first back cover 212 of the first housing 21 and the second back cover 222 of the second housing 22.

There may be one, two, or more rotary mechanisms 23. FIG. 4 and FIG. 5 only show an example in which there are two rotary mechanisms 23. This cannot be considered as a special limitation to this application. The two rotary mechanisms 23 are spaced apart from each other in a length direction of a folding axis of the foldable screen 10.

Figure 6:
FIG. 6 is a schematic structural diagram of a rotary mechanism according to some embodiments of this application.
Figure 6:
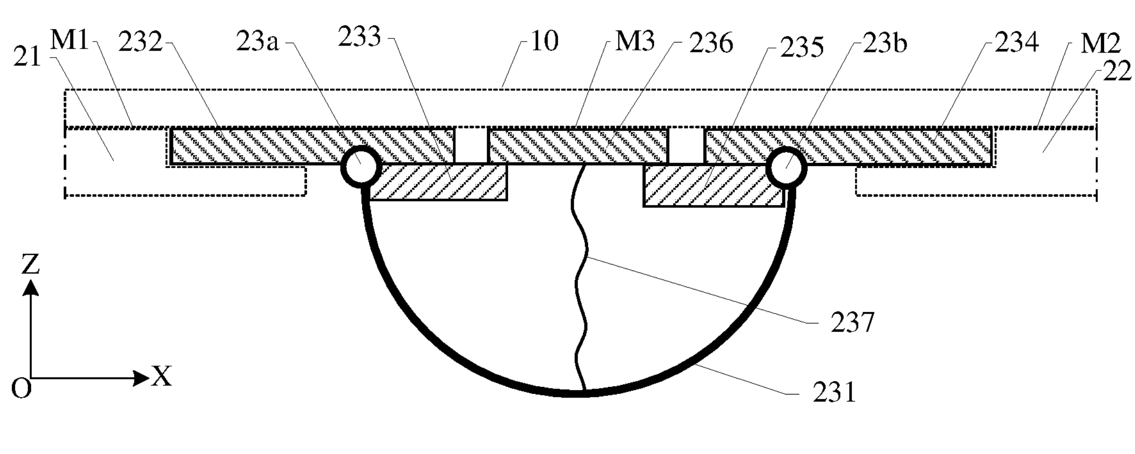

FIG. 6 is a schematic structural diagram of a rotary mechanism 23 according to some embodiments of this application; In this embodiment, the rotary mechanism 23 includes a base 231, a first connector 232, a first support arm 233, a second connector 234, a second support arm 235, a lifting plate 236, and a lifting structure 237.

The first connector 232 is rotatably connected to the base 231 by a first rotary shaft **23*a*. The first connector 232 is configured to connect to the first housing 21. The first support arm 233 is relatively fixed to the first connector 232**.

The second connector 234 is rotatably connected to the base 231 by a second rotary shaft **23*b*. The first rotary shaft 23*a* is arranged in parallel to the second rotary shaft 23*b*. The second connector 234 is configured to connect to the second housing 22. The second support arm 235 is relatively fixed to the second connector 234**.

The lifting plate 236 is located between the first connector 232 and the second connector 234. The lifting plate 236 is supported on the first support arm 233 and the second support arm 235. The lifting plate 236 includes a fitting surface M3. The rotary mechanism 23 is configured to support the third portion 13 of the foldable screen 10 by using the fitting surface M3. The fitting surface M3, the fitting surface M1 of the first housing 21, and the fitting surface M2 of the second housing 22 are arranged coplanarly or approximately coplanarly, and have the same orientation. In this case, positions in which the first connector 232 and the second connector 234 are located are unfolded positions. The first connector 232 and the second connector 234 are rotatable between the unfolded position and a folded position. In a case that the first connector 232 and the second connector 234 are in the folded position, the fitting surface M1 and the fitting surface M2 face each other. The fitting surface M1 and the fitting surface M3 and the fitting surface M2 and the fitting surface M3 are perpendicular or approximately perpendicular.

For ease of description of the following embodiments, an XYZ coordinate system is established. An extending direction of the first rotary shaft 23*a* in the rotary mechanism 23 is defined as a Y-axis direction. A thickness direction of the lifting plate 236 is a Z-axis direction. A direction parallel to the lifting plate 236 and perpendicular to the first rotary shaft 23*a* is an X-axis direction. It may be understood that the coordinate system of the rotary mechanism 23 may be flexibly set according to an actual requirement. This application only provides an example, which cannot be considered as a special limitation to this application.

The lifting structure 237 is located on a side of the lifting plate 236 away from the fitting surface M3. The lifting structure 237 is connected to the lifting plate 236. The lifting structure 237 is configured to apply a driving force away from the fitting surface M3 to the lifting plate 236. In a case that the first connector 232 and the second connector 234 are rotated from the unfolded position to the folded position, support forces of the first support arm 233 and the second support arm 235 on the lifting plate 236 are gradually canceled out. The driving force may drive the lifting plate 236 to sink away from the fitting surface M3, to avoid the foldable screen 10. In a case that the first connector 232 and the second connector 234 are rotated from the folded position to the unfolded position, the first support arm 233 and the second support arm 235 apply an upward support force on the lifting plate 236. The support force can overcome the driving force, to lift the fitting surface M3 of the lifting plate 236 to be flush with the fitting surface M1 and the fitting surface M2.

There are various structural forms of the lifting structure 237. In some embodiments, still referring to FIG. 6, the lifting structure 237 is a spiral spring. One end of the spiral spring is connected to the lifting plate 236. An other end of the spiral spring is connected to the base 231. The spiral spring is in an elongated deformation state to apply an elastic force away from the fitting surface M3 to the lifting plate 236. This elastic force forms the foregoing driving force. In some other embodiments, the lifting structure 237 includes a magnet (not shown in the figure) and a magnetically conductive sheet (not shown in the figure). One of the magnet and the magnetically conductive sheet is fixed on the lifting plate 235. The other of the magnet and the magnetically conductive sheet is fixed on the base 231. There is magnetic attraction between the magnet and the magnetically conductive sheet, to apply a magnetic attraction force away from the fitting surface M3 to the lifting plate 236. The magnetic attraction force forms the foregoing driving force. The two types of lifting structures 237 occupy a relatively large height in the Z-axis direction, leading to relatively large thickness of the support apparatus 20 and the electronic device 100 in a case that the first connector 232 and the second connector 234 are in the unfolded position, which is not conducive to a light and thin design of the electronic device 100.

Figure 7:
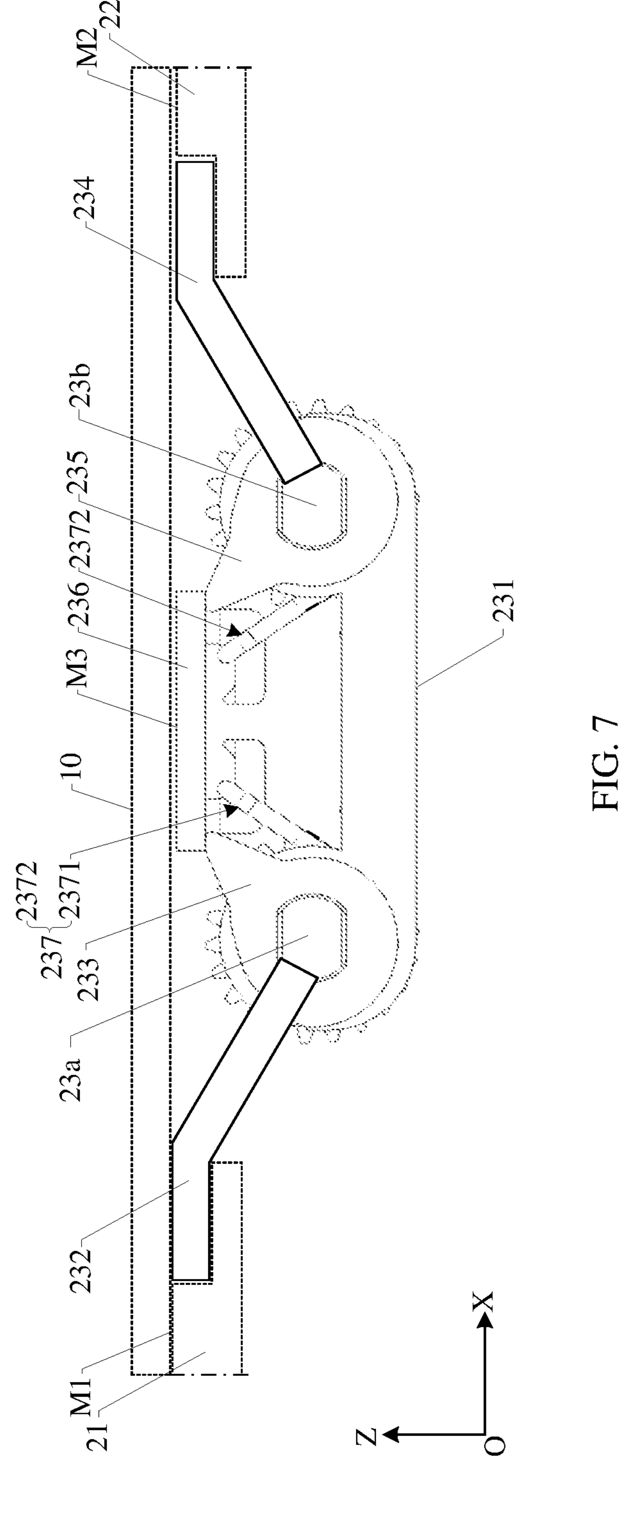
FIG. 7 is a front view of a rotary mechanism in a case that a first connector and a second connector are in an unfolded position according to some other embodiments of this application.

To reduce the thickness of the electronic device 100 in a case that the first connector 232 and the second connector 234 are in the unfolded position, FIG. 7 is a front view of a rotary mechanism 23 in a case that a first connector 232 and a second connector 234 are in an unfolded position according to some other embodiments of this application. In this embodiment, the rotary mechanism 23 includes a base 231, a first connector 232, a first support arm 233, a second connector 234, a second support arm 235, a lifting plate 236, and a lifting structure 237.

It may be understood that FIG. 7 only schematically shows some components included in the rotary mechanism 23. The actual shapes, sizes, positions, and structures of these components are not limited in FIG. 7.

The first connector 232 is rotatably connected to the base 231 by a first rotary shaft 23*a*.

In some embodiments, the first connector 232 is fixed on the first rotary shaft 23*a*. Optionally, a fixing hole (not shown in the figure) is provided in the first connector 232. The first connector 232 passes through the first rotary shaft 23*a* by using the fixing hole, and is fixed together to the first rotary shaft 23*a* through an interference fit, welding, flat position arrangement, or the like.

Figure 8:
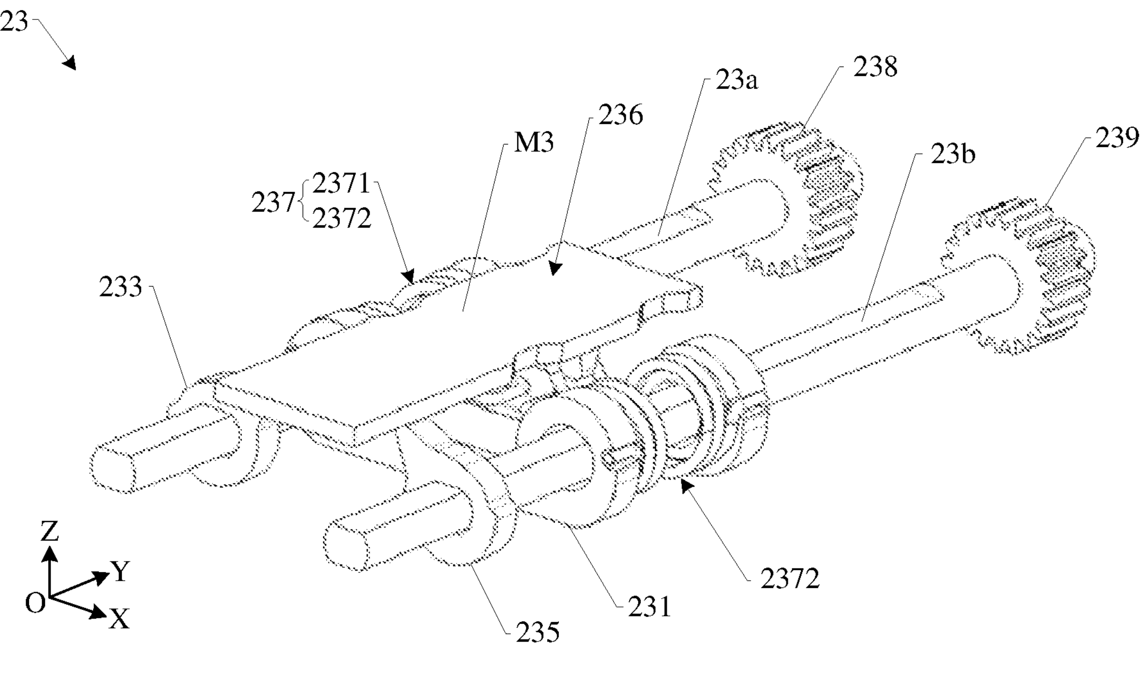
FIG. 8 is a three-dimensional view of the rotary mechanism shown in FIG. 7 (where the first connector and the second connector are not shown)
Figure 9:
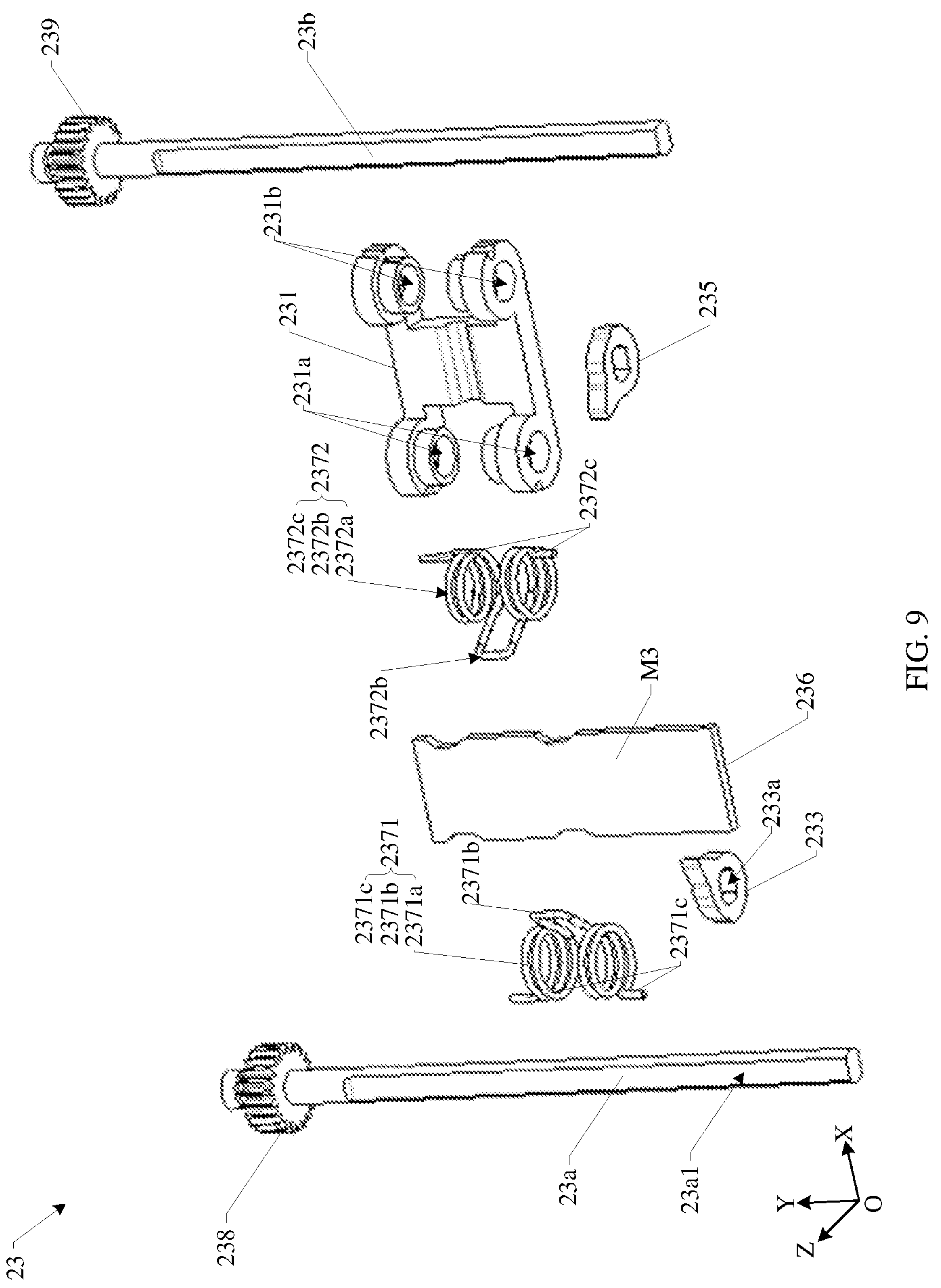
FIG. 9 is an exploded view of the rotary mechanism shown in FIG. 8.

FIG. 8 is a three-dimensional view of the rotary mechanism 23 shown in FIG. 7 (where the first connector 232 and the second connector 234 are not shown). FIG. 9 is an exploded view of the rotary mechanism 23 shown in FIG. 8 (where the first connector 232 and the second connector 234 are not shown). A first rotary hole 231*a* is provided in the base 231. The first rotary shaft 23*a* passes through the first rotary hole 231*a* and is rotatable in the first rotary hole 231*a*. In this way, in a case that the first connector 232 rotates relative to the base 231, the first rotary shaft 23*a* also rotates accordingly.

In another embodiment, a rotary hole is provided in the first connector 232. The first connector 232 is sleeved on the first rotary shaft 23*a*, and can rotate around the first rotary shaft 23*a* by using the rotary hole. The first rotary shaft 23*a* is fixed on the base 231. In this way, in a case that the first connector 232 rotates relative to the base 231, the first rotary shaft 23*a* is fixed relative to the base 231.

Referring back to FIG. 7, the first connector 232 is configured to connect to the first housing 21. Specifically, the first connector 232 may be fixed together to the first housing 21 through welding, riveting, a threaded connection, or the like, or may be slidably or rotatably connected to the first housing 21. The first connector 232 may be directly connected to the first housing 21 or indirectly connected to the first housing 21 by another intermediate structure. In the embodiment shown in FIG. 7, the first connector 232 is directly and fixedly connected to the first housing 21 through a threaded connection, riveting, welding, or the like.

Similarly, the second connector 234 is rotatably connected to the base 231 by a second rotary shaft 23*b*. The first rotary shaft 23*a* and the second rotary shaft 23*b* are arranged in parallel or approximately in parallel.

In some embodiments, the second connector 234 is fixed on the second rotary shaft 23*b*. Optionally, a fixing hole (not shown in the figure) is arranged on the second connector 234. The second connector 234 passes through the second rotary shaft 23*b* by using the fixing hole, and is fixed together to the second rotary shaft 23*b* through an interference fit, welding, flat position arrangement, or the like.

Referring to FIG. 9, a second rotary hole 231*b* is provided in the base 231. The second rotary shaft 23*b* passes through the second rotary hole 231*b*, and is rotatable in the second rotary hole 231*b*. In this way, in a case that the second rotary shaft 23*b* rotates relative to the base 231, the second rotary shaft 23*b* also rotates accordingly.

In another embodiment, a rotary hole is provided in the second connector 234. The second connector 234 is sleeved on the first rotary shaft 23*b*, and can rotate around the second rotary shaft 23*b* by using the rotary hole. The second rotary shaft 23*b* is fixed on the base 231. In this way, in a case that the second connector 234 rotates relative to the base 231, the second rotary shaft 23*b* is fixed relative to the base 231.

Referring back to FIG. 7, the second connector 234 is configured to connect to the second housing 22. Specifically, the second connector 234 may be fixed together to the second housing 22 through welding, riveting, a threaded connection, or the like, or may be slidably or rotatably connected to the second housing 22. The second connector 234 may be directly connected to the second housing 22, or indirectly connected to the second housing 22 by another intermediate structure. In the embodiment shown in FIG. 7, the second connector 234 is directly and fixedly connected to the second housing 22 through a threaded connection, riveting, welding, or the like.

In the embodiments of this application, the first rotary shaft 23*a* and the second rotary shaft 23*b* may be used only as rotary shafts, or may be used as gear shafts for driving the first connector 232 and the second connector 234 to move synchronously. In some embodiments, referring to FIG. 8 and FIG. 9, a first gear 238 is fixed on the first rotary shaft 23*a*. A central axis of the first gear 238 is collinear with a central axis of the first rotary shaft 23*a*. A second gear 239 is fixed on the second rotary shaft 23*b*. A central axis of the second gear 239 is collinear with a central axis of the second rotary shaft 23*b*. A diameter of the first gear 238 is equal to a diameter of the second gear 239. The first gear 238 and the second gear 239 are in meshed transmission. Alternatively, an even quantity of intermediate gears are arranged between the first gear 238 and the second gear 239. The first gear 238, the even quantity of intermediate gears, and the second gear 239 are sequentially in meshed transmission. In this way, the first connector 232 and the second connector 234 may be driven by the first gear 238 and the second gear 239 or by the first gear 238, the even quantity of intermediate gears, and the second gear 239 to rotate synchronously in opposite directions. Therefore, the first connector 232 and the second connector 234 can be driven to move synchronously.

Figure 10:
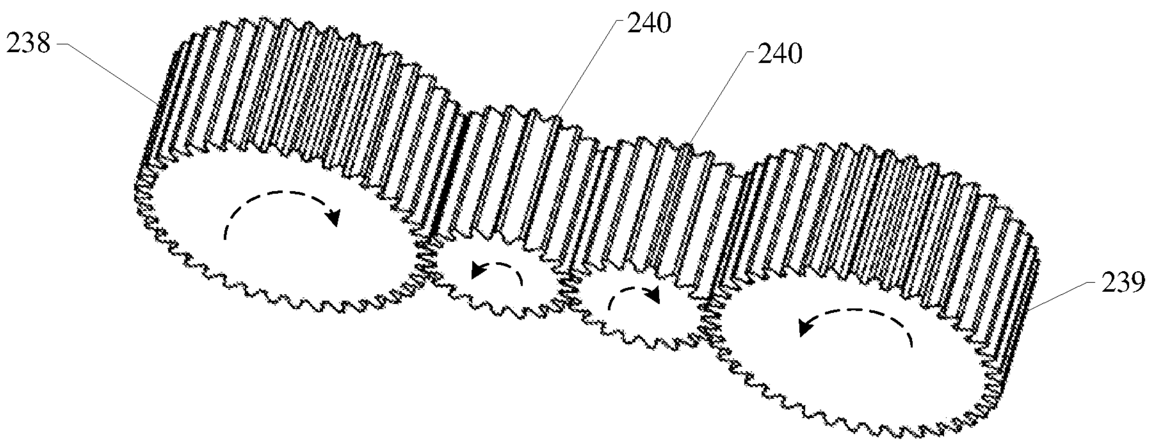
FIG. 10 is an assembly diagram of a first gear, an intermediate gear, and a second gear in a rotary mechanism according to some embodiments of this application.

In the foregoing embodiment, there may be two, four, six, or more intermediate gears. As the quantity of the intermediate gears increases, a diameter of each intermediate gear, the diameter of the first gear 238, and the diameter of the second gear 239 may be designed to be relatively small, to reduce a height of the rotary mechanism 23 in the Z-axis direction. However, as the quantity of the intermediate gears increases, the structural complexity of the rotary mechanism 23 also increases. Therefore, to ensure both the height and the structural complexity of the rotary mechanism 23, in some embodiments, FIG. 10 is an assembly diagram of a first gear 238, intermediate gears 340, and a second gear 239 in a rotary mechanism 23 according to some embodiments of this application. In this embodiment, there are two intermediate gears 340.

Figure 15A:
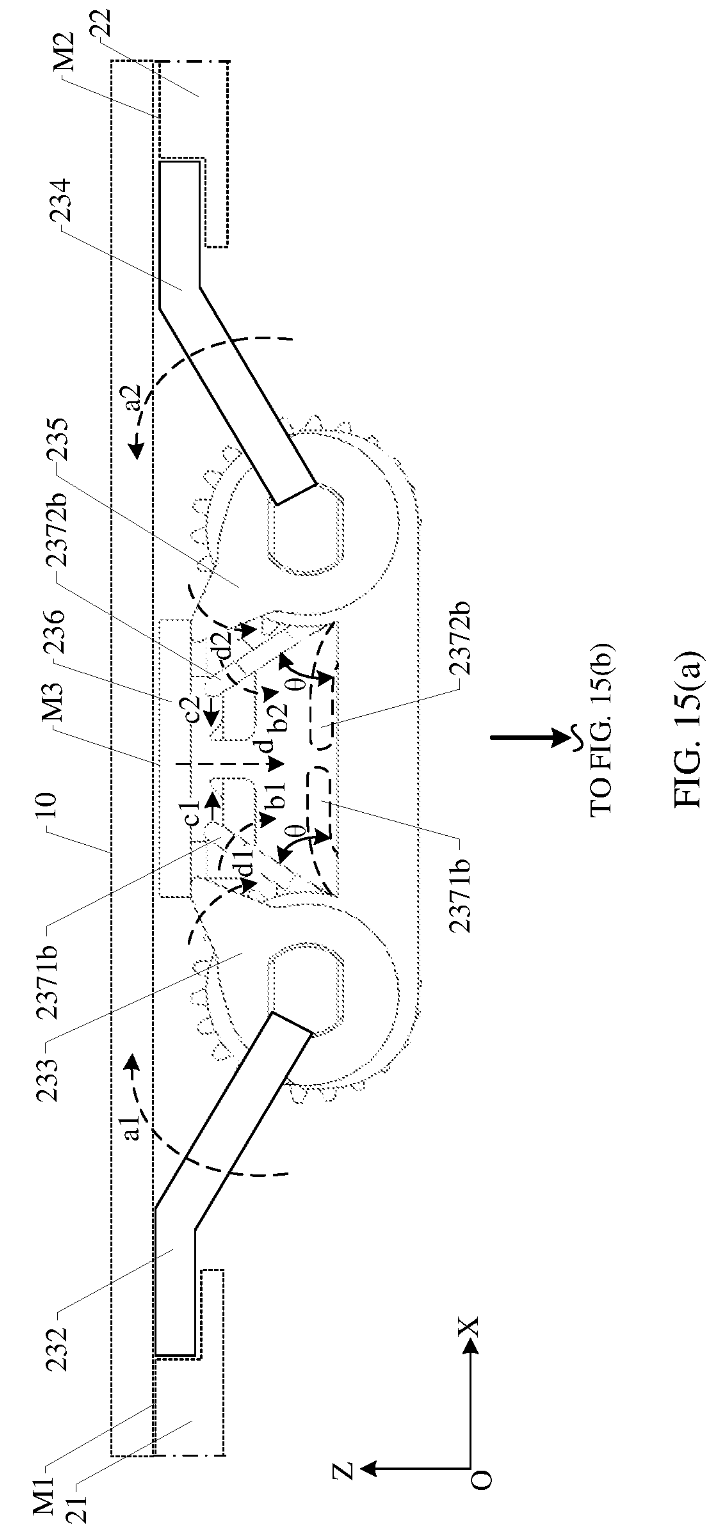
FIG. 15 is a schematic structural diagram of the rotary mechanism shown in FIG. 7 in a case that the first connector and the second connector are rotated from the unfolded position to a folded position, where FIG. 15(*a*) is a schematic structural diagram of the rotary mechanism in a case that the first connector and the second connector are in the unfolded position, and FIG. 15(*b*) is a schematic structural diagram of the rotary mechanism in a case that the first connector and the second connector are in the folded position.

Referring back to FIG. 7, the lifting plate 236 is located between the first connector 232 and the second connector 234. The lifting plate 236 includes a fitting surface M3. The rotary mechanism 23 is configured to support the third portion 13 of the foldable screen 10 by the fitting surface M3. The fitting surface M3, the fitting surface M1 of the first housing 21, and the fitting surface M2 of the second housing 22 are arranged coplanarly, and have the same orientation. In this case, positions in which the first connector 232 and the second connector 234 are located are unfolded positions. The first connector 232 and the second connector 234 are rotatable between the unfolded position and a folded position. As shown in FIG. 15(*b*), in a case that the first connector 232 and the second connector 234 are in the folded position, the fitting surface M1 and the fitting surface M2 face each other. The fitting surface M1 and the fitting surface M3 and the fitting surface M2 and the fitting surface M3 are perpendicular or approximately perpendicular.

The lifting structure 237 is connected to the lifting plate 236. Specifically, in this embodiment, referring to FIG. 7 to FIG. 9, the lifting structure 237 includes a first torsion spring 2371 and a second torsion spring 2372.

Referring to FIG. 9, the first torsion spring 2371 includes a first spiral body 2371*a* and a first torsion arm 2371*b*.

The first spiral body 2371*a* is sleeved on the first rotary shaft 23*a*. The first rotary shaft 23*a* is rotatable in the first spiral body 2371*a*.

In some embodiments, the first spiral body 2371*a* may be directly sleeved on the first rotary shaft 23*a*.

Figure 11:
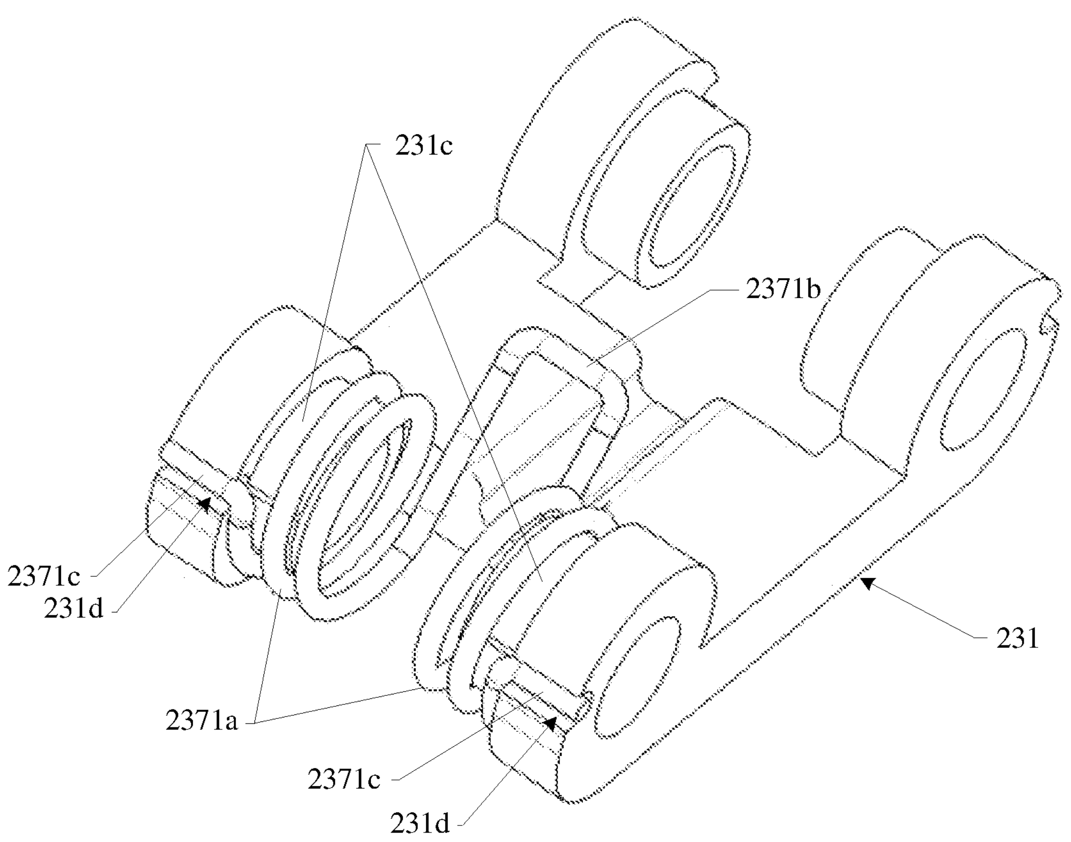
FIG. 11 is an assembly diagram of a first torsion spring and the base in the rotary mechanism shown in FIG. 9.

In some other embodiments, FIG. 11 is an assembly diagram of the first torsion spring 2371 and a base 231 in the rotary mechanism 23 shown in FIG. 9. In this embodiment, a shaft sleeve 231*c* is arranged on the base 231. The shaft sleeve 231*c* is sleeved on the first rotary shaft 23*a*. The first rotary shaft 23*a* is rotatable in the shaft sleeve 231*c*. The first spiral body 2371*a* is sleeved on the shaft sleeve 231*c*. In this way, the first spiral body 2371*a* is indirectly sleeved on the first rotary shaft 23*a* by the shaft sleeve 231*c*. A contact surface between the shaft sleeve 231*c* and the first rotary shaft 23*a* is relatively large, which can avoid jamming due to stress concentration during relative rotation.

Referring to FIG. 8 and FIG. 9, the first torsion arm 2371*b* is located on a side of the lifting plate 236 away from the fitting surface M3. One end of the first torsion arm 2371*b* is fixed to one end of the first spiral body 2371*a*. An other end of the first torsion arm 2371*b* is slidably connected to the lifting plate 236 in the first direction (that is, the X-axis direction).

Figure 12:
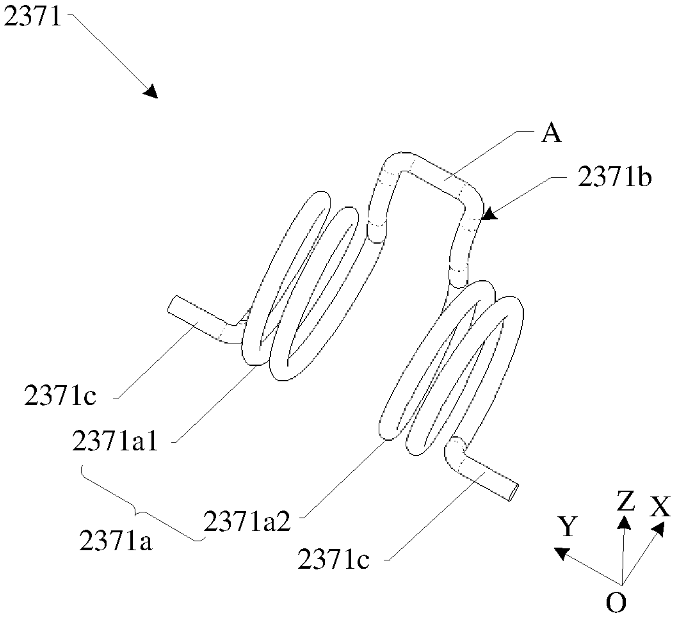
FIG. 12 is a schematic structural diagram of a first torsion spring in the rotary mechanism shown in FIG. 9.

To implement a slidable connection between the first torsion arm 2371*b* and the lifting plate 236, in some embodiments, FIG. 12 is a schematic structural diagram of the first torsion spring 2371 in the rotary mechanism 23 shown in FIG. 9. A hook portion A is arranged on a first torsion arm 2371*b* of the first torsion spring 2371.

To form the hook portion A, in some embodiments, still referring to FIG. 12, the first spiral body 2371*a* includes a first spiral portion 2371*a*1 and a second spiral portion 2371*a*2. The first spiral portion 2371*a*1 and the second spiral portion 2371*a*2 are sleeved on the first rotary shaft 23*a* in FIG. 9. The first spiral portion 2371*a*1 is spaced apart from the second spiral portion 2371*a*2 in the Y-axis direction. An end of the first spiral portion 2371*a*1 close to the second spiral portion 2371*a*2 is a first end of the first spiral portion 2371*a*1. An end of the second spiral portion 2371*a*2 close to the first spiral portion 2371_a_1 is a first end of the second spiral portion 2371_a_2. The first torsion arm 2371_b_ has an n shape. Two ends of the first torsion arm 2371_b_ are fixed between the first end of the first spiral portion 2371_a_1 and the first end of the second spiral portion 2371_a_2. An intermediate bending portion of the first torsion arm 2371_b_ forms the hook portion A.

Figure 13:
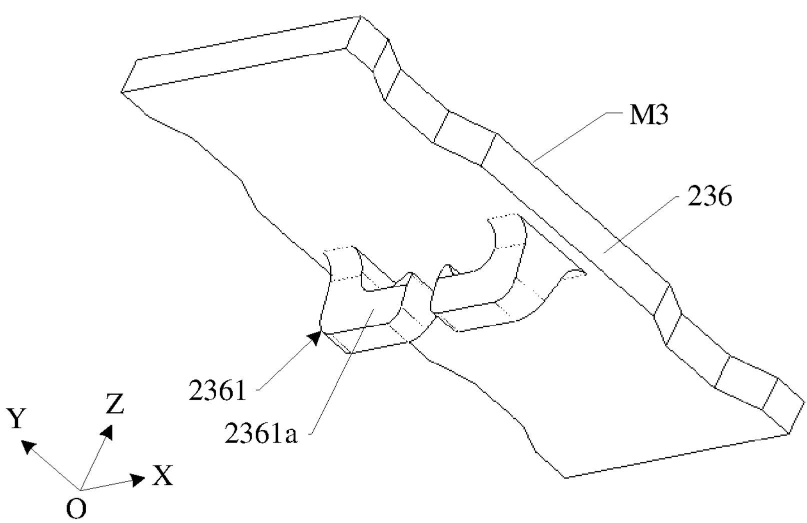
FIG. 13 is a schematic structural diagram of the lifting plate in the rotary mechanism shown in FIG. 9.

FIG. 13 is a schematic structural diagram of the lifting plate 236 in the rotary mechanism 23 shown in FIG. 9. A hook 2361 is arranged on a surface of the lifting plate 236 away from the fitting surface M3. The hook 2361 includes a guide section 2361_a_ extending in the X-axis direction.

Figure 14:
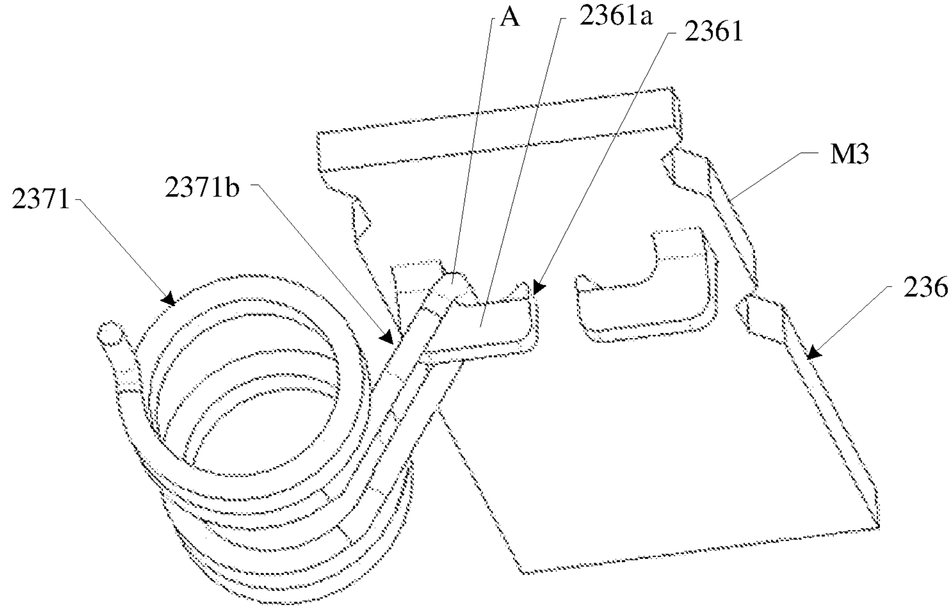
FIG. 14 is an assembly diagram of the first torsion spring shown in FIG. 12 and the lifting plate shown in FIG. 13.

FIG. 14 is an assembly diagram of the first torsion spring 2371 shown in FIG. 12 and the lifting plate 236 shown in FIG. 13. The first torsion arm 2371_b_ is hooked on the hook 2361 by the hook portion A and is slidable along the guide section 2361_a_. Therefore, a slidable connection between the first torsion arm 2371_b_ and the lifting plate 236 is implemented. This structure is simple and easy to be implemented.

In another embodiment, the slidable connection between the first torsion arm 2371_b_ and the lifting plate 236 may be a cooperating sliding connection between a slide block and a sliding groove, which is not specifically limited herein.

Based on the foregoing embodiment, an other end of the first spiral body 2371_a_ is fixed on the base 231. In some embodiments, referring to FIG. 9 and FIG. 12, the first torsion spring 2371 further includes a third torsion arm 2371_c_. The third torsion arm 2371_c_ forms the other end of the first spiral body 2371_a_. The first spiral body 2371_a_ is fixed on the base 231 by using the third torsion arm 2371_c_. Specifically, there are various manners to fix the third torsion arm 2371_c_ on the base 231. For example, the third torsion arm 2371_c_ may be fixed on the base 231 by welding. In another example, referring to FIG. 11, a limiting groove 231_d_ is provided in the base 231. The limiting groove 231_d_ extends in a direction parallel to the first rotary shaft 23_a_. The third torsion arm 2371_c_ is embedded in the limiting groove 231_d_. Therefore, rotation of the first spiral body 2371_a_ relative to the base 231 may be prevented. Fixing of the first spiral body 2371_a_ and the base 231 may be implemented. This fixing manner does not require a complex welding operation, and can improve the assembly efficiency of the rotary mechanism 23.

In some embodiments, referring to FIG. 12, an end of the first spiral portion 2371_a_1 away from the second spiral portion 2371_a_2 is a second end of the first spiral portion 2371_a_1. An end of the second spiral portion 2371_a_2 away from the first spiral portion 2371_a_1 is a second end of the second spiral portion 2371_a_2. There are two third torsion arms 2371_c_. The two third torsion arms 2371_c_ are respectively fixed to the second end of the first spiral portion 2371_a_1 and the second end of the second spiral portion 2371_a_2. The first spiral body 2371_a_ is fixed on the base 231 by the two third torsion arms 2371_c_. In this way, the first torsion spring 2371 is symmetrically designed. The first spiral body 2371_a_ may be fixed on the base 231 (referring to FIG. 11) by the two third torsion arms 2371_c_, which can ensure the fixing stability of the first spiral body 2371_a_ on the base 231.

Similarly, referring to FIG. 9, the second torsion spring 2372 includes a second spiral body 2372_a_ and a second torsion arm 2372_b_.

The second spiral body 2372_a_ is sleeved on the second rotary shaft 23_b_. The second rotary shaft 23_b_ is rotatable relative to the second spiral body 2372_a_. It may be understood that, a specific sleeving manner of the second spiral body 2372_a_ and the second rotary shaft 23_b_ may be implemented with reference to the foregoing sleeving manner of the first spiral body 2371_a_ and the first rotary shaft 23_a_. Details are not described herein again.

The second torsion arm 2372_b_ is located on the side of the lifting plate 236 away from the fitting surface M3. One end of the second torsion arm 2372_b_ is fixed to one end of the second spiral body 2372_a_. An other end of the second torsion arm 2372_b_ is slidably connected to the lifting plate 236 in the X-axis direction. A slidable connection between the second torsion arm 2372_b_ and the lifting plate 236 may be implemented with reference to the foregoing embodiment of the slidable connection between the first torsion arm 2371_b_ and the lifting plate 236. Details are not described herein again. An other end of the second spiral body 2372_a_ is fixed on the base 231. In some embodiments, the second torsion spring 2372 further includes a fourth torsion arm 3272_c_. The fourth torsion arm 3272_c_ forms the other end of the second spiral body 3272_a_. The second spiral body 2372_a_ is fixed on the base 231 by the fourth torsion arm 3272_c_. A specific fixing manner of the fourth torsion arm 3272_c_ and the base 231 may be implemented with reference to the foregoing fixing manner of the third torsion arm 2371_c_ and the base 231. Details are not described herein again.

The first support arm 233 and the second support arm 235 are both located on the side of the lifting plate 236 away from the fitting surface M3.

One end of the first support arm 233 is fixed on the first rotary shaft 32_a_. For example, the first support arm 233 may be welded and fixed on the first rotary shaft 32_a_. In another example, referring to FIG. 9, a first flat position 23_a_1 is arranged on a side surface of the first rotary shaft 23_a_. The "flat position" means a plane portion formed through milling on the side surface. An axis having the flat position is also referred to as a flat position shaft. Corresponding to the flat position shaft, a flat position may also be arranged on an inner wall of a hole. The hole having the flat position is also referred to as a flat position hole. The flat position hole and the flat position shaft cooperate to prevent a relative rotation of the hole and the shaft. There may be one or more first flat positions 23_a_1. In some embodiments, there may be two first flat positions 23_a_1. The two first flat positions 23_a_1 are respectively arranged at both ends of the first rotary shaft 23_a_ in a radial direction of the first rotary shaft. In another embodiment, there may be one first flat position 23_a_1. A flat position hole 233_a_ is arranged on the first support arm 233. The first support arm 233 passes through the first rotary shaft 23_a_ by cooperating with the flat position hole 233_a_. Therefore, the first support arm 233 is prevented from rotating around the first rotary shaft 32_a_, so that a relative position between the first support arm 233 and the first rotary shaft 23_a_ is fixed. In this fixing manner, the connection stability between the first support arm 233 and the first rotary shaft 23_a_ is adequate, and mounting is convenient, which can reduce the assembly difficulty of the rotary mechanism 23 and improve the assembly efficiency of the rotary mechanism 23.

An other end of the first support arm 233 extends toward the second rotary shaft 23_b_.

Similarly, one end of the second support arm 235 is fixed on the second rotary shaft 23_b_. Specifically, a specific fixing manner of the second support arm 235 and the second rotary shaft 23_b_ may be implemented with reference to the foregoing fixing manner of the first support arm 233 and the first rotary shaft 23_a_. Details are not described herein again. An other end of the second support arm 235 extends toward the first rotary shaft 23_a_.

FIG. 15 is a schematic structural diagram of the rotary mechanism 23 shown in FIG. 7 in a case that the first connector 232 and the second connector 234 are rotated from an unfolded position to a folded position.

FIG. 15(*a*) is a schematic structural diagram of the rotary mechanism 23 in a case that the first connector 232 and the second connector 234 are in the unfolded position. At this position, the lifting plate 236 is supported on the first support arm 233 and the second support arm 235. The first torsion arm 2371*b* and the second torsion arm 2372*b* are in a deformed state swinging toward the fitting surface M3. Referring to FIG. 15(*a*), positions shown by dotted lines of the first torsion arm 2371*b* and the second torsion arm 2372*b* are positions of the first torsion arm 2371*b* and the second torsion arm 2372*b* in a free state (that is, an unstressed state). Positions shown by solid lines of the first torsion arm 2371*b* and the second torsion arm 2372*b* are positions of the first torsion arm 2371*b* and the second torsion arm 2372*b* in a case that the first connector 232 and the second connector 234 are in the unfolded position. Each of the positions shown by the solid lines and each of the positions shown by the dotted lines shows a swing by a specific angle θ in the direction closer to the fitting surface M3. That is, the first torsion arm 2371*b* and the second torsion arm 2372*b* are in the deformed state swinging toward the fitting surface M3. The swing deformation angle is 0. In some embodiments, 0 is greater than 0° and less than or equal to 85°. Optionally, the swing deformation angle θ is 45°, thereby helping to control a sinking height of the lifting plate 236.

In a case that the first connector 232 and the second connector 234 are rotated to the folded position in a direction a1 and a direction a2 respectively, the first support arm 233 and the second support arm 235 swing away from the fitting surface M3 in a direction d1 and a direction d2 respectively. In this case, the lifting plate 236 loses a support force. The first torsion arm 2371*b* and the second torsion arm 2372*b* swing away from the fitting surface M3 in a direction b1 and a direction b2 respectively under the action of elastic forces of the first torsion arm and the second torsion arm. When swinging, the first torsion arm 2371*b* and the second torsion arm 2372*b* slide relative to the lifting plate 236 in a direction c1 and a direction c2 respectively. Therefore, the lifting plate 236 may be driven to sink in a direction d.

In a case that the first torsion arm 2371*b* and the second torsion arm 2372*b* are swung by the angle θ, the lifting plate 236 sinks to the lowest position. Then, in a case that the first connector 232 and the second connector 234 continue to rotate, the lifting plate 236 no longer sinks. FIG. 15(*b*) is a schematic structural diagram of the rotary mechanism 23 in a case that the first connector 232 and the second connector 234 are in the folded position. At this position, a water drop-shaped foldable screen 10 may be formed to increase the reliability and service life of the foldable screen 10.

Contrary to the foregoing process, in a case that the first connector 232 and the second connector 234 are rotated from the folded position to the unfolded position, the first connector 232 and the second connector 234 swing in opposite directions of the direction d1 and the direction d2 respectively. In a swinging process after contacting the lifting plate 236, the lifting plate 236 may be jacked up. In addition, the first torsion arm 2371*b* and the second torsion arm 2372*b* swing and deform toward the fitting surface M3. Therefore, the fitting surface M3 of the lifting plate 236 is allowed to be flush with the fitting surface M1 and the fitting surface M2, so that the foldable screen 10 supported thereon is flat.

Figure 16:
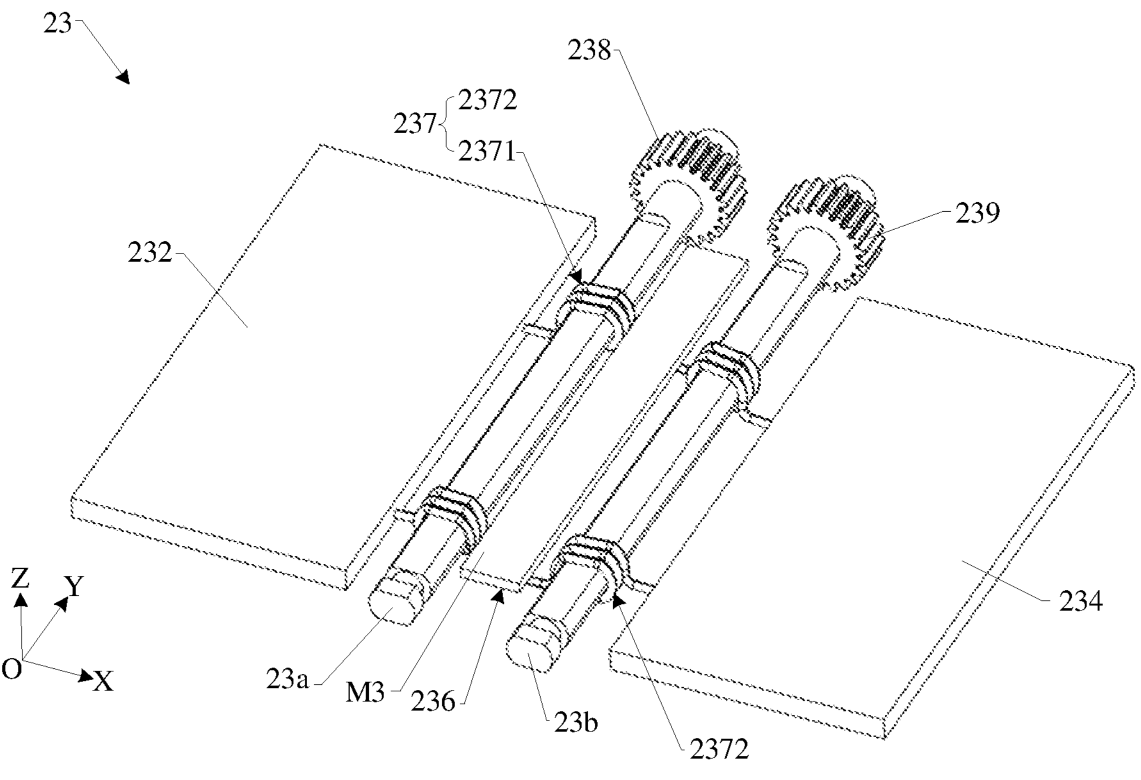
FIG. 16 is a three-dimensional view of a rotary mechanism according to some other embodiments of this application.
Figure 17:
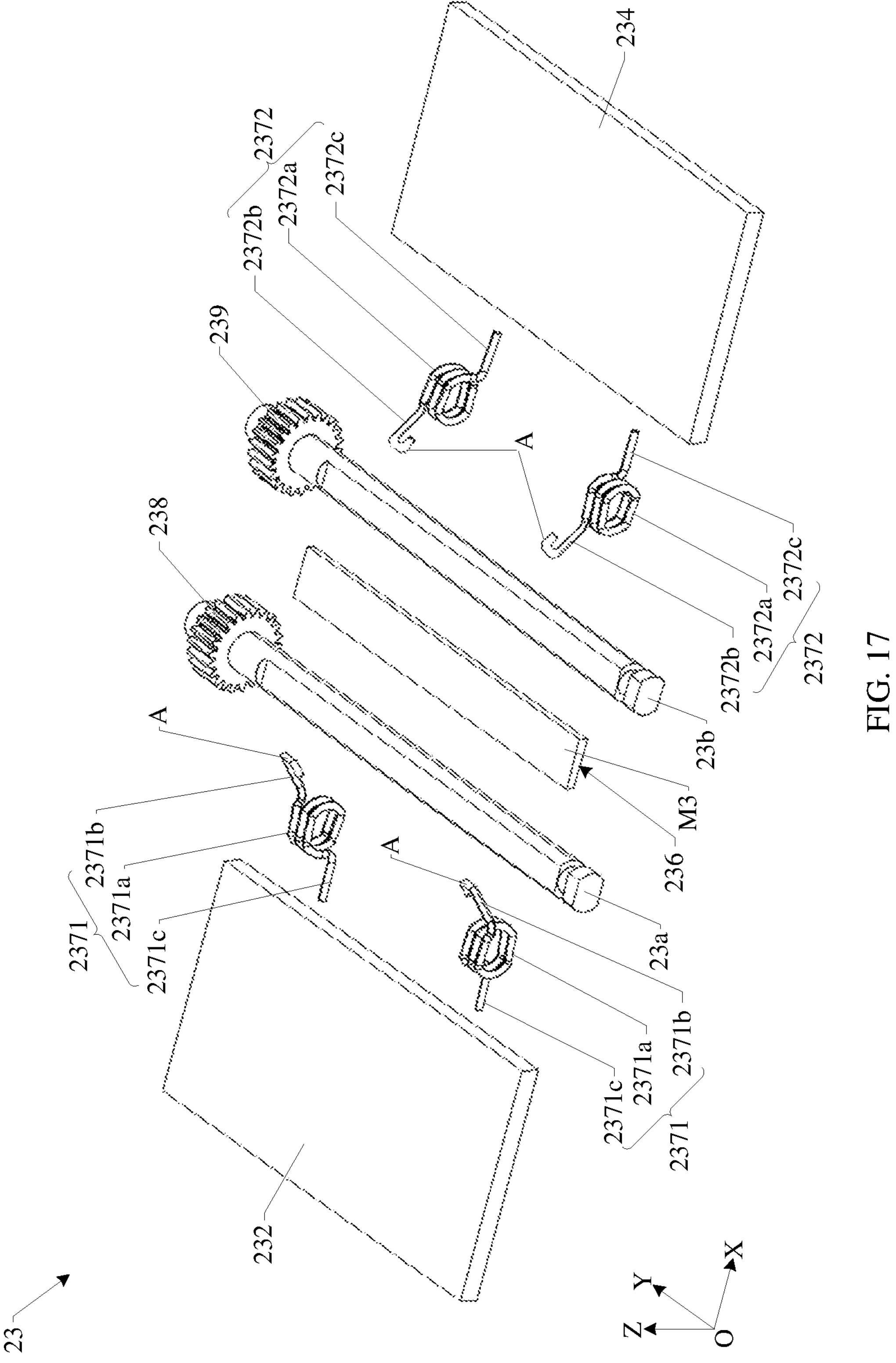
FIG. 17 is an exploded view of the rotary mechanism shown in FIG. 16.

FIG. 16 is a three-dimensional view of a rotary mechanism 23 according to some other embodiments of this application. FIG. 17 is an exploded view of the rotary mechanism 23 shown in FIG. 16. The base 231 is not shown in this embodiment. Compared with the rotary mechanism 23 shown in FIG. 7 to FIG. 9, the rotary mechanism 23 shown in this embodiment is different in that the rotary mechanism 23 does not include a first support arm 233 and a second support arm 235. The first spiral body 2371*a* is fixedly sleeved on the first rotary shaft 23*a*. The second spiral body 2372*a* is fixedly sleeved on the second rotary shaft 23*b*. The third torsion arm 2371*c* is fixedly connected to the first connector 232. The fourth torsion arm 3272*c* is fixedly connected to the second connector 234. In this embodiment, the rotary mechanism 23 may not include the third torsion arm 2371*c* and the fourth torsion arm 3272*c*.

In the foregoing embodiment, when the first spiral body 2371*a* is fixedly sleeved on the first rotary shaft 23*a*, it means that the first spiral body 2371*a* is sleeved on the first rotary shaft 23*a*, a relative position between the first spiral body 2371*a* and the first rotary shaft 23*a* is fixed, and the first spiral body cannot rotate around the first rotary shaft 23*a*.

In some embodiments, the first spiral body 2371*a* is sleeved and fixed on the first rotary shaft 23*a* by welding a welding joint.

Figure 18:
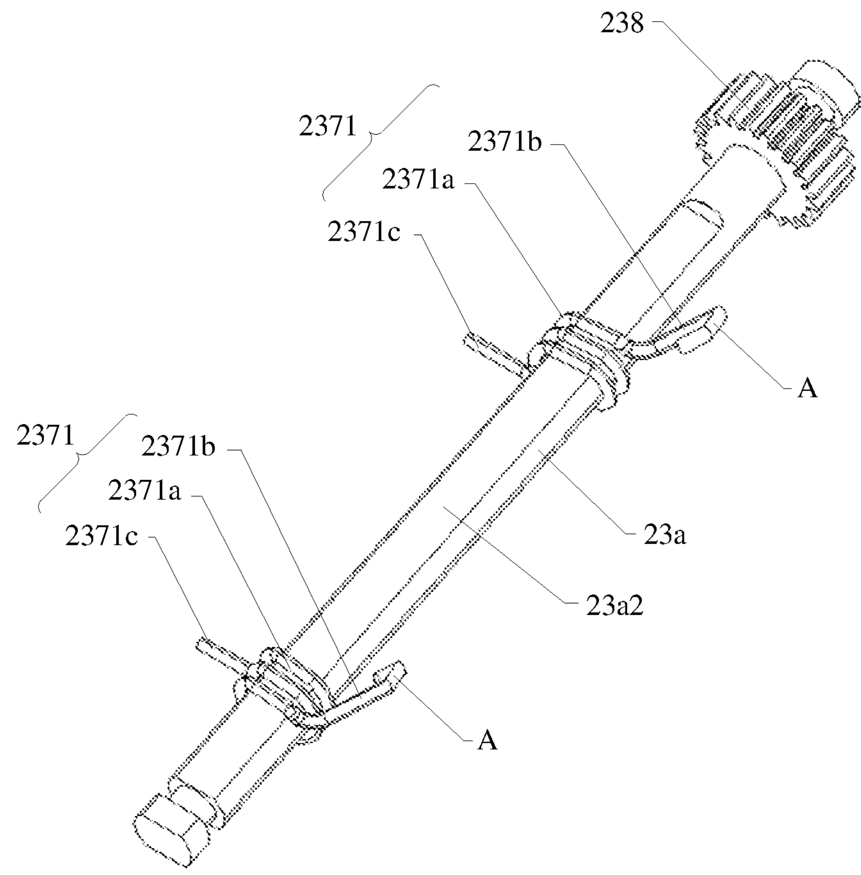
FIG. 18 is an assembly diagram of a first torsion spring and a first rotary shaft in the rotary mechanism shown in FIG. 17.

In some other embodiments, FIG. 18 is an assembly diagram of a first torsion spring 2371 and a first rotary shaft 23*a* in the rotary mechanism 23 shown in FIG. 17. In this embodiment, a second flat position 23*a*2 is arranged on the first rotary shaft 23*a*. An inner hole of the first spiral body 2371*a* is a flat position hole. The first spiral body 2371*a* is sleeved on the first rotary shaft part in which the second flat position 23*a*2 is located by cooperating the inner hole. In this way, the connection stability between the first torsion spring 2371 and the first rotary shaft 23*a* is adequate, and mounting is convenient, which can reduce the assembly difficulty of the rotary mechanism 23 and improve the assembly efficiency of the rotary mechanism 23.

Similarly, when the second spiral body 2372*a* is fixedly sleeved on the second rotary shaft 23*b*, it means that the second spiral body 2372*a* is sleeved on the second rotary shaft 23*b*, a relative position between the second spiral body 2372*a* and the second rotary shaft 23*b* is fixed, and the second spiral body cannot rotate around the second rotary shaft 23*b*. It should be noted that, a specific fixing manner of the second spiral body 2372*a* and the second rotary shaft 23*b* may be implemented with reference to the foregoing fixing manner of the first spiral body 2371*a* and the first rotary shaft 23*a*. Details are not described herein again.

Figure 19:
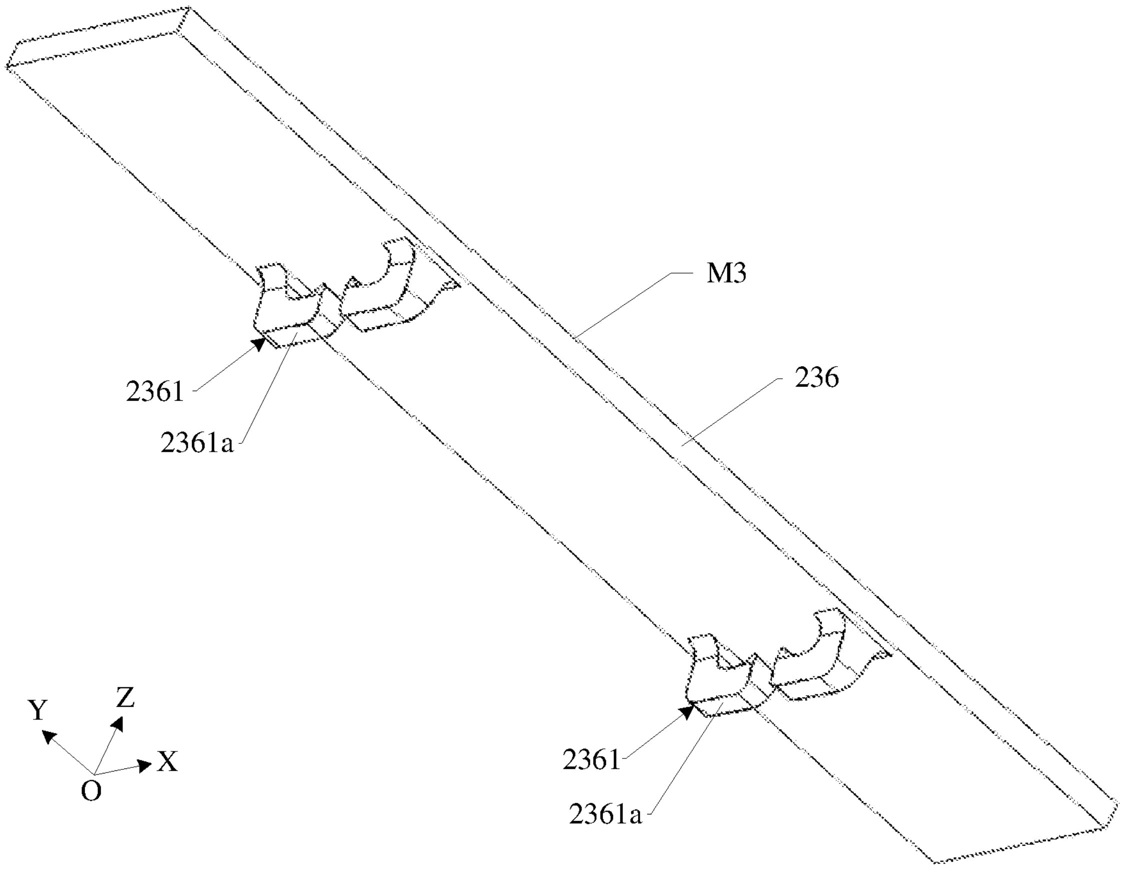
FIG. 19 is a schematic structural diagram of the lifting plate in the rotary mechanism shown in FIG. 17 viewed from bottom to top.

Compared with the rotary mechanism 23 shown in FIG. 7 to FIG. 9, the rotary mechanism 23 shown in FIG. 16 and FIG. 17 is further different in that, referring to FIG. 18, there are both two first torsion springs 2371 and two second torsion springs 2372. Hook portions A of the first torsion spring 2371 and the second torsion spring 2372 are both hook-shaped. Correspondingly, FIG. 19 is a schematic structural diagram of a lifting plate 236 in the rotary mechanism 23 shown in FIG. 17 viewed from bottom to top. A hook 2361 is arranged at a position of the lifting plate 236 corresponding to each hook portion A.

Figure 20:
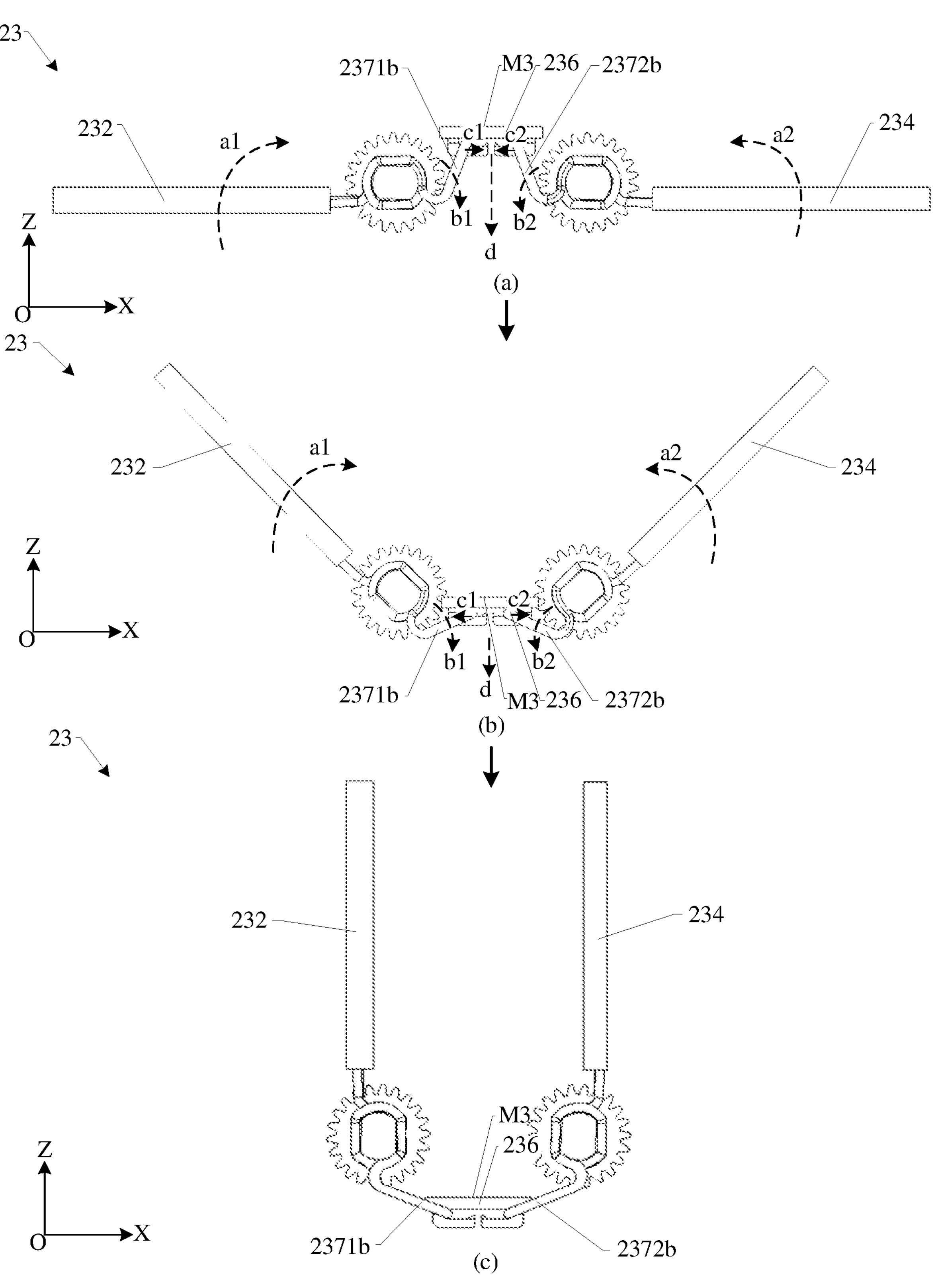
FIG. 20 is a schematic structural diagram of the rotary mechanism shown in FIG. 16 in a case that the first connector and the second connector are rotated from an unfolded position to a folded position, where (a) in FIG. 20 is a schematic structural diagram of the rotary mechanism in a case that the first connector and the second connector are in the unfolded position, (b) in FIG. 20 is a schematic structural diagram of the rotary mechanism in a case that the first connector and the second connector are rotated by 45°, and (c) in FIG. 20 is a schematic structural diagram of the rotary mechanism in a case that the first connector and the second connector are in the folded position.

FIG. 20 is a schematic structural diagram of the rotary mechanism 23 shown in FIG. 16 in a case that the first connector 232 and the second connector 234 are rotated from an unfolded position to a folded position. (a) in FIG. 20 is a schematic structural diagram of the rotary mechanism 23 in a case that the first connector 232 and the second connector 234 are in the unfolded position. In a case that the first connector 232 and the second connector 234 are rotated to the folded position in the direction a1 and the direction a2 respectively, the first torsion arm 2371*b* and the second torsion arm 2372*b* may be driven to swing away from the fitting surface M3 of the lifting plate 236 in the direction b1 and the direction b2 respectively. When swinging, the first torsion arm 2371*b* and the second torsion arm 2372*b* slide relative to the lifting plate 236 in a direction c1 and a direction c2 respectively, thereby driving the lifting plate 236 to sink in the direction d. (b) in FIG. 20 is a schematic structural diagram of the rotary mechanism 23 in a case that the first connector 232 and the second connector 234 are rotated by 45°. (c) in FIG. 20 is a schematic structural diagram of the rotary mechanism 23 in a case that the first connector 232 and the second connector 234 are in the folded position. At this position, the lifting plate 236 sinks to the lowest position, thereby forming a water drop-shaped foldable screen 10 (not shown), to increase the reliability and service life of the foldable screen 10.

Contrary to the foregoing process, in a case that the first connector 232 and the second connector 234 are rotated from the folded position to the unfolded position, the first torsion arm 2371*b* and the second torsion arm 2372*b* may be driven to swing toward the fitting surface M3 of the lifting plate 236 in opposite directions of the direction b1 and an opposite direction of the direction b2 respectively. When swinging, the first torsion arm 2371*b* and the second torsion arm 2372*b* slide relative to the lifting plate 236 in opposite directions of the direction c1 and an opposite direction of the direction c2 respectively, thereby driving the lifting plate 236 to rise in opposite directions of the direction d, to allow the fitting surface M3 of the lifting plate 236 to be flush with the fitting surface M1 and the fitting surface M2, so that the foldable screen 10 supported thereon is flat.

In the rotary mechanism 23 provided in the embodiments of this application, the first torsion spring 2371 and the second torsion spring 2372 are respectively mounted in surrounding spaces of the first rotary shaft 23*a* and the second rotary shaft 23*b*. The lifting plate 236 is driven to sink and rise by using the first torsion spring 2371 and the second torsion spring 2372, which can reduce a height occupied by the lifting structure 237 in the Z-axis direction, thereby allowing the electronic device to be lighter and thinner in an unfolded state.

Because the support apparatus 20 provided in the embodiments of this application includes the rotary mechanism 23 according to any one of the foregoing embodiments, the two can solve the same technical problem and achieve the same effect.

Because the electronic device 100 provided in the embodiments of this application includes the support apparatus 20 according to any one of the foregoing embodiments, the two can solve the same technical problem and achieve the same effect.

In the descriptions of this specification, the specific features, structures, materials, or characteristics may be combined in a proper manner in any one or more of the embodiments or examples.

Finally, it should be noted that the foregoing embodiments are merely used for describing the technical solutions of this application, but are not intended to limit this application. Although this application is described in detail with reference to the foregoing embodiments, it should be understood that a person of ordinary skill in the art may still make modifications to the technical solutions described in the foregoing embodiments or make equivalent replacements to some technical features thereof, and these modifications or replacements will not cause the essence of corresponding technical solutions to depart from the spirit and scope of the technical solutions in the embodiments of this application.

The invention claimed is:

1. A rotary mechanism, comprising: a base, a first connector, a second connector, a lifting plate, a first torsion spring, and a second torsion spring, the first connector being rotatably connected to the base by a first rotary shaft, the second connector being rotatably connected to the base by a second rotary shaft, the second rotary shaft being parallel to the first rotary shaft, the lifting plate being located between the first connector and the second connector, the lifting plate comprising a fitting surface, the fitting surface (M3) being configured to fit a part of a foldable screen, the first torsion spring comprising a first spiral body and a first torsion arm, the first spiral body being sleeved on the first rotary shaft, the first torsion arm being located on a side of the lifting plate away from the fitting surface, one end of the first torsion arm by being fixed to one end of the first spiral body, an other end of the first torsion arm being slidably connected to the lifting plate in a first direction, the second torsion spring comprising a second spiral body and a second torsion arm, the second spiral body being sleeved on the second rotary shaft, the second torsion arm being located on the side of the lifting plate away from the fitting surface, one end of the second torsion arm being fixed to one end of the second spiral body, an other end of the second torsion arm being slidably connected to the lifting plate in the first direction, the first direction being parallel to the lifting plate and being perpendicular to the first rotary shaft, the first connector and the second connector being rotatable between an unfolded position and a folded position relative to the base, in a case that the first connector and the second connector are rotated from the unfolded position to the folded position, the first torsion arm and the second torsion arm being driven to swing away from the fitting surface of the lifting plate, to drive the lifting plate to sink, in a case that the first connector and the second connector are rotated from the folded position to the unfolded position, the first torsion arm and the second torsion arm being driven to swing toward the fitting surface of the lifting plate, to drive the lifting plate to rise.

2. The rotary mechanism according to claim 1, wherein the first connector is fixed on the first rotary shaft, a first rotary hole is provided in the base, and the first rotary shaft passes through the first rotary hole, and is rotatable in the first rotary hole; and the second connector is fixed on the second rotary shaft, a second rotary hole is provided in the base, and the second rotary shaft passes through the second rotary hole, and is rotatable in the second rotary hole.

3. The rotary mechanism according to claim 2, wherein the first spiral body is fixedly sleeved on the first rotary shaft, the first torsion arm is located on a side of the first rotary shaft close to the second rotary shaft, the second spiral body is fixedly sleeved on the second rotary shaft, and the second torsion arm is located on a side of the second rotary shaft close to the first rotary shaft.

4. The rotary mechanism according to claim 3, wherein a second flat position is arranged on the first rotary shaft, an inner hole of the first spiral body is a flat position hole, and the first spiral body is sleeved on the first rotary shaft by cooperating with the inner hole.

5. The rotary mechanism according to claim 2, wherein a first gear is fixed on the first rotary shaft, and a central axis of the first gear is collinear with a central axis of the first rotary shaft;

a second gear is fixed on the second rotary shaft, and a central axis of the second gear is collinear with a central axis of the second rotary shaft; and a diameter of the first gear is equal to a diameter of the second gear, and the first gear and the second gear are in meshed transmission, or an even quantity of intermediate gears is arranged between the first gear and the second gear, the first gear, the even quantity of intermediate gears, and the second gear are sequentially in meshed transmission.

6. The rotary mechanism, according to claim 2, wherein the first spiral body is sleeved on the first rotary shaft, the first rotary shaft is rotatable in the first spiral body, and an other end of the first spiral body is fixed on the base;

the second spiral body is sleeved on the second rotary shaft, the second rotary shaft is rotatable in the second spiral body, and an other end of the second spiral body is fixed on the base;

the rotary mechanism further comprises a first support arm and a second support arm; the first support arm and the second support arm are both located on the side of the lifting plate away from the fitting surface, one end of the first support arm is fixed on the first rotary shaft, an other end of the first support arm extends toward the second rotary shaft, one end of the second support arm is fixed on the second rotary shaft, an other end of the second support arm extends toward the first rotary shaft; and in a case that the first connector and the second connector are in the unfolded position, the lifting plate is supported on the first support arm and the second support arm, and the first torsion arm and the second torsion arm are in a deformed state swinging toward the fitting surface.

7. The rotary mechanism according to claim 6, wherein in a case that the first connector and the second connector are in the unfolded position, a swing deformation angle each of a third torsion arm and a fourth torsion arm toward the fitting surface is greater than 0° and less than or equal to 85°.

8. The rotary mechanism according to claim 6, wherein a first flat position is arranged on a side surface of the first rotary shaft, a flat position hole is provided in one end of the first support arm, and the first support arm is sleeved on the first rotary shaft by cooperating with the flat position hole.

9. The rotary mechanism according to claim 6, wherein a hook portion is arranged on the first torsion arm;

a hook is arranged on a surface of the lifting plate away from the fitting surface, and the hook comprises a guide section extending in the first direction; and the first torsion arm is hooked on the hook; by the hook portion and is slidable along the guide section.

10. The rotary mechanism according to claim 9, wherein the first spiral body comprises a first spiral portion and a second spiral portion, the first spiral portion and the second spiral portion are sleeved on the first rotary shaft, and the first spiral portion is spaced apart from the second spiral portion in a length direction of the first rotary shaft;

an end of the first spiral portion close to the second spiral portion is a first end of the first spiral portion; an end of the second spiral portion close to the first spiral portion is a first end of the second spiral portion; and the first torsion arm has an n shape, two ends of the first torsion arm are fixed between the first end of the first spiral portion and the first end of the second spiral portion, and an intermediate bending portion of the first torsion arm forms the hook portion.

11. The rotary mechanism according to claim 10, wherein an end of the first spiral portion away from the second spiral portion is a second end of the first spiral portion; an end of the second spiral portion away from the first spiral portion is a second end of the second spiral portion; and the first spiral body is fixed on the base by the second end of the first spiral portion and the second end of the second spiral portion.

12. A support apparatus, comprising: a first housing, a second housing, and a rotary mechanism according to claim 1, the rotary mechanism being located between the first housing, and the second housing, a first connector of the rotary mechanism being connected to the first housing, a second connector of the rotary mechanism being connected to the second housing.

13. An electronic device, comprising: a foldable screen and the support apparatus according to claim 12, the foldable screen comprising a first portion, a second portion, and a third portion, the third portion being located between the first portion and the second portion, the first portion being supported and fixed on the first housing, the second portion being supported and fixed on the second housing, the third portion being supported on a rotary mechanism of the support apparatus.

* * * * *